(12) United States Patent
Green

(10) Patent No.: US 9,647,263 B2
(45) Date of Patent: May 9, 2017

(54) ELECTROACTIVE MATERIAL

(75) Inventor: Mino Green, London (GB)

(73) Assignee: Nexeon Limited, Oxfordshire (GB)

( * ) Notice: Subject to any disclaimer, the term of this patent is extended or adjusted under 35 U.S.C. 154(b) by 632 days.

(21) Appl. No.: 13/820,234

(22) PCT Filed: Sep. 2, 2011

(86) PCT No.: PCT/GB2011/001299
§ 371 (c)(1),
(2), (4) Date: May 3, 2013

(87) PCT Pub. No.: WO2012/028858
PCT Pub. Date: Mar. 8, 2012

(65) Prior Publication Data
US 2013/0224583 A1 Aug. 29, 2013

(30) Foreign Application Priority Data
Sep. 3, 2010 (GB) .................................. 1014707.2

(51) Int. Cl.
| H01M 4/36 | (2006.01) |
| B82Y 30/00 | (2011.01) |
| C01B 33/02 | (2006.01) |
| H01M 4/134 | (2010.01) |
| H01M 4/1395 | (2010.01) |
| H01M 4/38 | (2006.01) |
| H01M 4/48 | (2010.01) |
| H01M 4/58 | (2010.01) |
| H01M 4/62 | (2006.01) |
| H01M 10/0568 | (2010.01) |
| H01M 4/64 | (2006.01) |
| H01M 4/04 | (2006.01) |
| H01M 4/505 | (2010.01) |
| H01M 4/525 | (2010.01) |
| H01M 4/587 | (2010.01) |
| H01M 10/0525 | (2010.01) |
| H01M 10/054 | (2010.01) |
| H01M 4/02 | (2006.01) |

(52) U.S. Cl.
CPC .............. *H01M 4/364* (2013.01); *B82Y 30/00* (2013.01); *C01B 33/02* (2013.01); *H01M 4/134* (2013.01); *H01M 4/1395* (2013.01); *H01M 4/362* (2013.01); *H01M 4/38* (2013.01); *H01M 4/483* (2013.01); *H01M 4/58* (2013.01); *H01M 4/5815* (2013.01); *H01M 4/621* (2013.01); *H01M 4/64* (2013.01); *H01M 10/0568* (2013.01); *H01M 4/0402* (2013.01); *H01M 4/0404* (2013.01); *H01M 4/505* (2013.01); *H01M 4/525* (2013.01); *H01M 4/587* (2013.01); *H01M 4/623* (2013.01); *H01M 4/625* (2013.01); *H01M 10/054* (2013.01); *H01M 10/0525* (2013.01); *H01M 2004/021* (2013.01); *H01M 2004/027* (2013.01); *Y02E 60/122* (2013.01); *Y02P 70/54* (2015.11)

(58) Field of Classification Search
CPC combination set(s) only.
See application file for complete search history.

(56) References Cited

U.S. PATENT DOCUMENTS

| 3,351,445 A | 11/1967 | Fielder et al. |
| 4,002,541 A | 1/1977 | Streander |
| 4,436,796 A | 3/1984 | Huggins et al. |
| 4,950,566 A | 8/1990 | Huggins et al. |
| 5,260,148 A | 11/1993 | Idota |
| 5,262,021 A | 11/1993 | Lehmann et al. |
| 5,660,948 A | 8/1997 | Barker |
| 5,907,899 A | 6/1999 | Dahn et al. |
| 5,980,722 A | 11/1999 | Kuroda et al. |
| 6,022,640 A | 2/2000 | Takada et al. |
| 6,042,969 A | 3/2000 | Yamada et al. |

(Continued)

FOREIGN PATENT DOCUMENTS

| CN | 1447916 A | 10/2003 |
| CN | 1674325 A | 9/2005 |
| CN | 1821446 A | 8/2006 |
| CN | 101266919 A | 9/2008 |
| CN | 101371381 A | 2/2009 |
| CN | 101442124 A | 5/2009 |
| CN | 101449410 A | 6/2009 |
| CN | 101471457 A | 7/2009 |
| CN | 101510602 A | 8/2009 |

(Continued)

OTHER PUBLICATIONS

Peng, K. et al., "Metal-Particle-Induced, Highly Localized Site-Specific Etching of Si and Formation of Single-Crystalline Si Nanowires in Aqueous Fluoride Solution", Chemistry A European Journal 2006, 12, pp. 7942-7947 (2006).

(Continued)

*Primary Examiner* — Alex Usyatinsky
(74) *Attorney, Agent, or Firm* — Fay Sharpe LLP

(57) ABSTRACT

A composition for use in a lithium ion battery includes a plurality of elongate elements and a plurality of particles. The elongate elements and particles each include a metal or semi-metal selected from one or more of the group including silicon, tin, germanium, aluminum or mixtures thereof. The composition may include additional ingredients such as a binder, a conductive material and a further electro-active material, such as graphite. The compositions can be used for the fabrication of electrodes, preferably anodes in the manufacture of lithium ion batteries and optionally batteries based on magnesium ions or sodium ions. The composition is able to intercalate and release lithium during the charging and discharging cycles respectively of a battery into which it has been incorporated. Methods of fabricating the composition and electrodes including the composition are included as well as electrodes thus prepared and devices including such electrodes.

22 Claims, No Drawings

(56) References Cited

U.S. PATENT DOCUMENTS

| | | | |
|---|---|---|---|
| 6,063,995 A | 5/2000 | Bohland et al. | |
| 6,190,951 B1 | 2/2001 | Nakahori et al. | |
| 6,235,427 B1 | 5/2001 | Idota et al. | |
| 6,296,969 B1 | 10/2001 | Yano et al. | |
| 6,334,939 B1 | 1/2002 | Zhou et al. | |
| 6,337,156 B1 | 1/2002 | Narang et al. | |
| 6,353,317 B1 | 3/2002 | Green et al. | |
| 6,399,177 B1 | 6/2002 | Fonash et al. | |
| 6,399,246 B1 | 6/2002 | Vandayburg et al. | |
| 6,428,909 B2 | 8/2002 | Oketani et al. | |
| 6,432,579 B1 | 8/2002 | Tsuji et al. | |
| 6,589,696 B2 | 7/2003 | Matsubara et al. | |
| 6,605,386 B1 | 8/2003 | Kasamatsu et al. | |
| 6,620,547 B1 | 9/2003 | Sung et al. | |
| 6,881,520 B1 | 4/2005 | Li | |
| 6,887,511 B1 | 5/2005 | Shima et al. | |
| 6,916,679 B2 | 7/2005 | Snyder et al. | |
| 7,033,936 B1 | 4/2006 | Green | |
| 7,051,945 B2 | 5/2006 | Empedocles et al. | |
| 7,070,632 B1 | 7/2006 | Visco et al. | |
| 7,094,499 B1 | 8/2006 | Hung | |
| 7,147,894 B2 | 12/2006 | Zhou et al. | |
| 7,192,673 B1 | 3/2007 | Ikeda et al. | |
| 7,311,999 B2 | 12/2007 | Kawase et al. | |
| 7,318,982 B2 | 1/2008 | Gozdz et al. | |
| 7,348,102 B2 | 3/2008 | Li et al. | |
| 7,358,011 B2 | 4/2008 | Fukuoka et al. | |
| 7,378,041 B2 | 5/2008 | Asao et al. | |
| 7,425,285 B2 | 9/2008 | Asao et al. | |
| 7,476,469 B2 | 1/2009 | Ota et al. | |
| 7,569,202 B2 | 8/2009 | Farrell et al. | |
| 7,659,034 B2 | 2/2010 | Minami et al. | |
| 7,674,552 B2 | 3/2010 | Nakai et al. | |
| 7,767,346 B2 * | 8/2010 | Kim | H01M 4/134 252/182.1 |
| 7,862,933 B2 | 1/2011 | Okumura et al. | |
| 7,879,734 B2 | 2/2011 | Fukutani et al. | |
| 8,034,485 B2 | 10/2011 | Dahn et al. | |
| 8,585,918 B2 | 11/2013 | Green et al. | |
| 8,597,831 B2 | 12/2013 | Green et al. | |
| 8,772,174 B2 | 7/2014 | Green et al. | |
| 2001/0023986 A1 | 9/2001 | Mancevski | |
| 2002/0074972 A1 | 6/2002 | Narang et al. | |
| 2002/0086211 A1 | 7/2002 | Umeno et al. | |
| 2002/0148727 A1 | 10/2002 | Zhou et al. | |
| 2003/0135989 A1 | 7/2003 | Huggins et al. | |
| 2004/0072067 A1 | 4/2004 | Minami et al. | |
| 2004/0126659 A1 | 7/2004 | Graetz et al. | |
| 2004/0151987 A1 | 8/2004 | Kawase et al. | |
| 2004/0166319 A1 | 8/2004 | Li et al. | |
| 2004/0185346 A1 | 9/2004 | Takeuchi et al. | |
| 2004/0197660 A1 | 10/2004 | Sheem et al. | |
| 2004/0214085 A1 | 10/2004 | Sheem et al. | |
| 2004/0224231 A1 | 11/2004 | Fujimoto et al. | |
| 2004/0241548 A1 | 12/2004 | Nakamoto et al. | |
| 2005/0042515 A1 | 2/2005 | Hwang et al. | |
| 2005/0079414 A1 * | 4/2005 | Yamamoto | C22B 26/12 429/218.1 |
| 2005/0079420 A1 | 4/2005 | Cho et al. | |
| 2005/0118503 A1 | 6/2005 | Honda et al. | |
| 2005/0191550 A1 | 9/2005 | Satoh et al. | |
| 2005/0193800 A1 | 9/2005 | DeBoer et al. | |
| 2005/0214644 A1 | 9/2005 | Aramata et al. | |
| 2006/0003226 A1 | 1/2006 | Sawa et al. | |
| 2006/0019115 A1 | 1/2006 | Wang et al. | |
| 2006/0019168 A1 | 1/2006 | Li et al. | |
| 2006/0024582 A1 | 2/2006 | Li et al. | |
| 2006/0051670 A1 | 3/2006 | Aramata et al. | |
| 2006/0057463 A1 | 3/2006 | Gao et al. | |
| 2006/0088767 A1 | 4/2006 | Li et al. | |
| 2006/0097691 A1 | 5/2006 | Green | |
| 2006/0134516 A1 | 6/2006 | Im et al. | |
| 2006/0134518 A1 | 6/2006 | Kogetsu et al. | |
| 2006/0147800 A1 | 7/2006 | Sato et al. | |
| 2006/0154071 A1 | 7/2006 | Homma et al. | |
| 2006/0166030 A1 | 7/2006 | Suzuki et al. | |
| 2006/0166093 A1 | 7/2006 | Zaghib et al. | |
| 2006/0175704 A1 | 8/2006 | Shimizu et al. | |
| 2006/0257307 A1 | 11/2006 | Yang | |
| 2006/0263687 A1 | 11/2006 | Leitner et al. | |
| 2006/0275663 A1 | 12/2006 | Matsuno et al. | |
| 2006/0275668 A1 | 12/2006 | Peres et al. | |
| 2006/0286448 A1 | 12/2006 | Snyder et al. | |
| 2007/0003835 A1 | 1/2007 | Hasegawa et al. | |
| 2007/0026313 A1 | 2/2007 | Sano | |
| 2007/0031733 A1 | 2/2007 | Kogetsu et al. | |
| 2007/0037063 A1 | 2/2007 | Choi et al. | |
| 2007/0048609 A1 | 3/2007 | Yeda et al. | |
| 2007/0059598 A1 | 3/2007 | Yang | |
| 2007/0065720 A1 | 3/2007 | Hasegawa et al. | |
| 2007/0072074 A1 | 3/2007 | Yamamoto et al. | |
| 2007/0087268 A1 * | 4/2007 | Kim | H01M 4/134 429/232 |
| 2007/0099084 A1 | 5/2007 | Huang et al. | |
| 2007/0099085 A1 | 5/2007 | Choi et al. | |
| 2007/0105017 A1 | 5/2007 | Kawase et al. | |
| 2007/0117018 A1 | 5/2007 | Huggins | |
| 2007/0122702 A1 | 5/2007 | Sung et al. | |
| 2007/0148544 A1 | 6/2007 | Le | |
| 2007/0172732 A1 | 7/2007 | Jung et al. | |
| 2007/0184345 A1 | 8/2007 | Neudecker et al. | |
| 2007/0190413 A1 | 8/2007 | Lee et al. | |
| 2007/0202395 A1 | 8/2007 | Snyder et al. | |
| 2007/0202402 A1 | 8/2007 | Asahina et al. | |
| 2007/0207080 A1 | 9/2007 | Yang | |
| 2007/0207385 A1 | 9/2007 | Liu et al. | |
| 2007/0209584 A1 | 9/2007 | Kalynushkin et al. | |
| 2007/0212538 A1 | 9/2007 | Niu | |
| 2007/0218366 A1 | 9/2007 | Kalynushkin et al. | |
| 2007/0224508 A1 | 9/2007 | Aramata et al. | |
| 2007/0224513 A1 | 9/2007 | Kalynushkin et al. | |
| 2007/0238021 A1 | 10/2007 | Liu et al. | |
| 2007/0243469 A1 | 10/2007 | Kim et al. | |
| 2007/0264564 A1 | 11/2007 | Johnson et al. | |
| 2007/0264574 A1 | 11/2007 | Kim et al. | |
| 2007/0269718 A1 | 11/2007 | Krause et al. | |
| 2007/0277370 A1 | 12/2007 | Kalynushkin et al. | |
| 2008/0003496 A1 | 1/2008 | Neudecker et al. | |
| 2008/0003503 A1 | 1/2008 | Kawakami et al. | |
| 2008/0020281 A1 | 1/2008 | Kogetsu et al. | |
| 2008/0038638 A1 | 2/2008 | Zhang et al. | |
| 2008/0044732 A1 | 2/2008 | Salot et al. | |
| 2008/0090149 A1 | 4/2008 | Sano et al. | |
| 2008/0096110 A1 | 4/2008 | Bito et al. | |
| 2008/0107967 A1 | 5/2008 | Liu et al. | |
| 2008/0113271 A1 | 5/2008 | Ueda et al. | |
| 2008/0118834 A1 | 5/2008 | Yew et al. | |
| 2008/0124631 A1 | 5/2008 | Fukui et al. | |
| 2008/0131782 A1 | 6/2008 | Hagiwara et al. | |
| 2008/0138710 A1 | 6/2008 | Liaw et al. | |
| 2008/0138716 A1 | 6/2008 | Iwama et al. | |
| 2008/0145752 A1 | 6/2008 | Hirose et al. | |
| 2008/0145759 A1 | 6/2008 | Sung et al. | |
| 2008/0160415 A1 | 7/2008 | Wakita et al. | |
| 2008/0176139 A1 | 7/2008 | White et al. | |
| 2008/0206631 A1 | 8/2008 | Christensen et al. | |
| 2008/0206641 A1 | 8/2008 | Christensen et al. | |
| 2008/0233479 A1 | 9/2008 | Sung et al. | |
| 2008/0233480 A1 | 9/2008 | Sung et al. | |
| 2008/0241647 A1 | 10/2008 | Fukui et al. | |
| 2008/0241703 A1 | 10/2008 | Yamamoto et al. | |
| 2008/0248250 A1 | 10/2008 | Flemming et al. | |
| 2008/0261112 A1 * | 10/2008 | Nagata et al. | 429/218.1 |
| 2008/0268338 A1 | 10/2008 | Lee et al. | |
| 2008/0305391 A1 | 12/2008 | Hirose et al. | |
| 2009/0029256 A1 | 1/2009 | Mah et al. | |
| 2009/0053589 A1 | 2/2009 | Obrovac et al. | |
| 2009/0078982 A1 | 3/2009 | Rachmady et al. | |
| 2009/0087731 A1 | 4/2009 | Fukui et al. | |
| 2009/0101865 A1 | 4/2009 | Matsubara et al. | |
| 2009/0117466 A1 * | 5/2009 | Zhamu | H01M 4/02 429/231.8 |
| 2009/0162750 A1 | 6/2009 | Kawakami et al. | |
| 2009/0186267 A1 | 7/2009 | Tiegs | |

(56) References Cited

U.S. PATENT DOCUMENTS

| | | | |
|---|---|---|---|
| 2009/0239151 A1 | 9/2009 | Nakanishi et al. | |
| 2009/0253033 A1 | 10/2009 | Hirose et al. | |
| 2009/0269677 A1* | 10/2009 | Hirose et al. | 429/218.1 |
| 2009/0305129 A1 | 12/2009 | Fukui et al. | |
| 2010/0085685 A1 | 4/2010 | Pinwill | |
| 2010/0092868 A1 | 4/2010 | Kim et al. | |
| 2010/0124707 A1 | 5/2010 | Hirose et al. | |
| 2010/0136437 A1 | 6/2010 | Nishida et al. | |
| 2010/0178565 A1 | 7/2010 | Green | |
| 2010/0196760 A1 | 8/2010 | Green | |
| 2010/0219380 A1 | 9/2010 | Hertlein et al. | |
| 2010/0285358 A1 | 11/2010 | Cui et al. | |
| 2010/0297502 A1 | 11/2010 | Zhu et al. | |
| 2010/0330419 A1 | 12/2010 | Cui et al. | |
| 2011/0104480 A1 | 5/2011 | Malekos et al. | |
| 2011/0250498 A1 | 10/2011 | Green et al. | |
| 2012/0094178 A1* | 4/2012 | Loveridge et al. | 429/217 |

FOREIGN PATENT DOCUMENTS

| | | |
|---|---|---|
| CN | 101567462 A | 10/2009 |
| DE | 199 22 257 A1 | 11/2000 |
| DE | 103 47 570 A1 | 5/2005 |
| EP | 0 281 115 | 9/1988 |
| EP | 0 553 465 A1 | 8/1993 |
| EP | 0 820 110 A2 | 1/1998 |
| EP | 1 011 160 A1 | 6/2000 |
| EP | 0 936 687 B1 | 12/2001 |
| EP | 1 205 989 A2 | 5/2002 |
| EP | 1 231 653 A1 | 8/2002 |
| EP | 1 231 654 A1 | 8/2002 |
| EP | 1 258 937 A1 | 11/2002 |
| EP | 1 083 614 B1 | 5/2003 |
| EP | 1 313 158 A2 | 5/2003 |
| EP | 1 335 438 A1 | 8/2003 |
| EP | 1 289 045 B1 | 3/2006 |
| EP | 1 657 769 A1 | 5/2006 |
| EP | 1 850 409 A1 | 10/2007 |
| EP | 1 771 899 B1 | 2/2008 |
| EP | 1 657 768 B1 | 5/2008 |
| EP | 1 942 520 A2 | 7/2008 |
| EP | 2 058 882 | 5/2009 |
| EP | 2 204 868 A3 | 7/2010 |
| FR | 2 885 913 B1 | 8/2007 |
| GB | 0 980 513 | 1/1965 |
| GB | 1 014 706 | 12/1965 |
| GB | 2 395 059 A | 5/2004 |
| GB | 2 464 157 B | 1/2010 |
| GB | 2 464 158 | 4/2010 |
| JP | 02-209492 A | 8/1990 |
| JP | 06-283156 | 10/1994 |
| JP | 10-046366 | 2/1998 |
| JP | 10-083817 | 3/1998 |
| JP | 10-199524 | 7/1998 |
| JP | 2000-003727 | 1/2000 |
| JP | 2000-173594 | 6/2000 |
| JP | 2000-348730 A | 12/2000 |
| JP | 2001-291514 | 10/2001 |
| JP | 2002-216751 A | 8/2002 |
| JP | 2002-279974 A | 9/2002 |
| JP | 2002260637 A | 9/2002 |
| JP | 2002-313319 A | 10/2002 |
| JP | 2002313345 A | 10/2002 |
| JP | 2003-017040 | 1/2003 |
| JP | 2003-168426 | 6/2003 |
| JP | 2003522367 A | 7/2003 |
| JP | 04-607488 | 2/2004 |
| JP | 2004-071305 | 3/2004 |
| JP | 2004-095264 | 3/2004 |
| JP | 2004-214054 | 7/2004 |
| JP | 2004-281317 | 10/2004 |
| JP | 2004-296386 A | 10/2004 |
| JP | 2004-533699 A | 11/2004 |
| JP | 2005-310759 A | 11/2005 |
| JP | 2006-505901 A | 2/2006 |
| JP | 2006-276214 A | 10/2006 |
| JP | 2006-290938 A | 10/2006 |
| JP | 2006-335410 A | 12/2006 |
| JP | 2007080827 A | 3/2007 |
| JP | 2007-165079 A | 6/2007 |
| JP | 2007318057 A | 12/2007 |
| JP | 2008-034266 | 2/2008 |
| JP | 2008-186732 | 8/2008 |
| JP | 2008210618 A | 9/2008 |
| JP | 2008-234988 | 10/2008 |
| JP | 2008-235258 A | 10/2008 |
| JP | 2008-269827 | 11/2008 |
| JP | 2008277000 A | 11/2008 |
| JP | 2009523923 A | 6/2009 |
| JP | 2009-164104 A | 7/2009 |
| JP | 2009-252348 A | 10/2009 |
| JP | 2010192444 A | 9/2010 |
| JP | 5000787 B2 | 8/2012 |
| JP | 2013510405 A | 3/2013 |
| JP | 2013-541806 A | 11/2013 |
| KR | 2004 0063802 A | 7/2004 |
| KR | 20050090218 A | 9/2005 |
| KR | 2007-023141 | 2/2007 |
| KR | 2007-0110569 A | 11/2007 |
| KR | 2008-038806 A | 5/2008 |
| KR | 100839376 B1 | 6/2008 |
| KR | 2010 0058486 A | 6/2010 |
| KR | 20100066441 A | 6/2010 |
| NL | 1015956 | 8/2000 |
| SU | 471402 | 5/1975 |
| SU | 544019 | 1/1977 |
| WO | WO 99/33129 | 7/1999 |
| WO | WO 01/13414 A1 | 2/2001 |
| WO | WO 01/35473 A1 | 5/2001 |
| WO | WO 01/96847 A1 | 12/2001 |
| WO | WO 02/25356 A2 | 3/2002 |
| WO | WO 02/47185 A2 | 6/2002 |
| WO | WO 03/063271 A1 | 7/2003 |
| WO | WO 03/075372 A2 | 9/2003 |
| WO | WO 2004/042851 A2 | 5/2004 |
| WO | WO 2004/052489 A2 | 6/2004 |
| WO | WO 2004/083490 A2 | 9/2004 |
| WO | WO 2004/109839 A1 | 12/2004 |
| WO | WO 2005/011030 A1 | 2/2005 |
| WO | WO 2005/113467 A1 | 12/2005 |
| WO | WO 2005/119753 A2 | 12/2005 |
| WO | WO 2006/067891 A1 | 6/2006 |
| WO | WO 2006/073427 A2 | 7/2006 |
| WO | WO 2006/120332 A2 | 11/2006 |
| WO | WO 2007/044315 A1 | 4/2007 |
| WO | WO 2007/083152 A1 | 7/2007 |
| WO | WO 2007/083155 | 7/2007 |
| WO | WO 2007/114168 A1 | 10/2007 |
| WO | WO 2007/136164 A1 | 11/2007 |
| WO | WO 2008/029888 A1 | 3/2008 |
| WO | WO 2008/044683 A1 | 4/2008 |
| WO | WO 2008/072460 A1 | 6/2008 |
| WO | WO 2008/097723 A1 | 8/2008 |
| WO | WO 2008/139157 A1 | 11/2008 |
| WO | WO 2009/010757 | 1/2009 |
| WO | WO 2009/010758 | 1/2009 |
| WO | WO 2009/010759 | 1/2009 |
| WO | WO 2009/026466 | 2/2009 |
| WO | WO 2009/120404 A1 | 10/2009 |
| WO | WO 2009/128800 | 10/2009 |
| WO | WO 2010/040985 | 4/2010 |
| WO | WO 2010/040986 | 4/2010 |
| WO | WO 2010/130976 * | 5/2010 |
| WO | WO 2010/060348 A1 | 6/2010 |
| WO | WO 2010/128310 A1 | 11/2010 |
| WO | WO 2010/130975 A1 | 11/2010 |
| WO | WO 2010/130976 A1 | 11/2010 |

OTHER PUBLICATIONS

Badel et al., "Formation of Ordered Pore Arrays at the Nanoscale by Electrochemical Etching of N-Type Silicon", Superlattices and Microstructures, 36 (2004) 245-253.

(56) References Cited

OTHER PUBLICATIONS

Barraclough et al., "Cold Compaction of Silicon Powders Without a Binding Agent", Materials Letters 61 (2007) 485-487.
Beaulieu et al., "Colossal Reversible vol. Changes in Lithium Alloys", Electrochemical and Solid-State Letters, 4 (9) (2001) A137-A140.
Beaulieu et al., "Reaction of Li with Grain-Boundary Atoms in Nanostructured Compounds", Journal of the Electrochemical Society, 147 (9) (2000) 3206-3212.
Besenhard et al., "Will Advanced Lithium-Alloy Anodes Have a Chance in Lithium-Ion Batteries?", Journal of Power Sources, 68 (1997) 87-90.
Boukamp et al., "All-Solid Lithium Electrodes with Mixed-Conductor Matrix", J. Electrochem. Soc.: Electrochemical Science and Technology, vol. 128, No. 4, (1981) 725-729.
Bourderau, et al., "Amorphous Silicon as a Possible Anode Material for Li-Ion Batteries", Journal of Power Sources, 81-82 (1999) 233-236.
Canham, L. T., "Diffusion of Li IN Si", Properties of Silicon, EMIS Datareviews Series No. 4 (1987) 454-462.
Chan et al., "Surface Chemistry and Morphology of the Solid Electrolyte Interphase on Silicon Nanowire Lithium-Ion Battery Anodes", Journal of Power Sources, 189(2), 1132-1140, (2009).
Chang et al., "Ultrafast Growth of Single-Crystalline Si Nanowires", Materials Letters, 60 (2006) 2125-2128.
Chen et al., Binder Effect on Cycling Performance of Silicon/Carbon Composite Anodes for Lithium Ion Batteries, 36 (2006) 1099-1104.
Chen et al., "Effect of Vinylene Carbonate (VC) as Electrolyte Additive on Electrochemical Performance of Si Film Anode for Lithium Ion Batteries", Journal of Power Sources, 174(2), 538-543, (2007).
Chen et al., "Selective Etching of Silicon in Aqueous Ammonia Solution", Sensors and Actuators, A 49 (1995) 115-121.
Chevrier et al., "Methods for Successful Cycling of Alloy Negative Electrodes in Li-Ion Cells", 220$^{th}$ ECS Meeting, Abstract #1237 (2011).
Choi et al., "Effect of Fluoroethylene Carbonate Additive on Interfacial Properties of Silicon Thin-Film Electrode", Journal of Power Sources, 161(2), 1254-1259 (2006).
Colinge, Jean-Pierre, "Silicon-on-Insulator Technology: Materials to VLSI", Chapter 2, SOI Materials, (1991), Cover page and p. 38.
Deal et al., "General Relationship for the Thermal Oxidation of Silicon", Journal of Applied Physics, vol. 36, No. 12, (Dec. 1965) 3770-3778.
De Angelis et al., "Water Soluble Nanoporous Nanoparticles for In Vivo Targeted Drug Deliver and Controlled Release in B Cells Tumor Context", Nanoscale, 1020, vol. 2, p. 2230-2236.
El Ouatani et al., "The Effect of Vinylene Carbonate Additive on Surface Film Formation on Both Electrodes in Li-Ion Batteries", J. Electrochem. Soc., 156(2), A103-A113 (2009).
Feng et al., "Lithography-Free Silicon Micro-Pillars as Catalyst Supports for Microfabricated Fuel Cell Applications", Electrochemistry Communications, 8 (2006) 1235-1238.
Garrido, et al., The Role of Chemical Species in the Passivation of <100> Silicon Surfaces by HF in Water-Ethanol Solutions, J. Electrochem Soc., vol. 143, No. 12, 1996, p. 4059-4066.
Green et al., "Mesoscopic Hemisphere Arrays for use as Resist in Solid State Structure Fabrication", J. Vac. Sci. Technol. B 17(5) (1999) 2074-2083.
Green et al., "Quantum Pillar Structures on n+ Gallium Arsenide Fabricated Using "Natural" Lithography", Appl. Phys. Lett., 62 (3) (1993) 264-266.
Green et al., "Structured Silicon Anodes for Lithium Battery Applications", Electrochemical and Solid-State Letters, 6 (5) (2003) A75-A79.
Han et al., "Neutralized Poly (Acrylic Acid) as Polymer Binder for High Capacity Silicon Negative Electrodes", 220$^{th}$ ECS Meeting, Abstract #1250 (2011).

Heinze et al., "Viscosity Behaviour of Multivalent Metal Ion-Containing Carboxymethyl Cellulose Solutions", Die Angewandte Makromolekulare Chamie 220, 123-132, (Nr. 3848), (1994).
Hochgatterer et al., "Silicon/Graphite Composite Electrodes for High Capacity Anodes: Influence of Binder Chemistry on Cycling Stability", Electrochemical and Solid-State Letters, 11 (5) (2008) A76-A80.
Huggins, Robert A., "Lithium Alloy Anodes" in Handbook of Battery Materials, J.O. Besenhard Ed., Wiley-VCH, Weinheim, 361-381 (1999).
Ivanovskaya et al., "The Effect of Treatment of Cation-Selective Glass Electrodes With AgNO3 Solution on Electrode Properties", Sensors and Actuators B 24-25 (1995) 304-308.
Jianfeng et al., "Large-Scale Array of Highly Oriented Silicon-Rich Micro/Nanowires Induced by Gas Flow Steering", Solid State Communications, 133 (2005) 271-275.
Kasavajjula et al., "Nano- and Bulk-Silicon-Based Insertion Anodes for Lithium-Ion Secondary Cells", Journal of Power Sources, 163 (2007) 1003-1039.
Key to Metal Aluminum-Silicon Alloys, www.keytometals.com/Article80.
Kim et al., "(110) Silicon Etching for High Aspect Ratio Comb Structures", 1997 6th International Conference on Emerging Technologies and Factory Automation Proceedings, (1997) 248-252.
Kim et al., "Improvement of Silicon Powder Negative Electrodes by Copper Electroless Deposition for Lithium Secondary Batteries", Journal of Power Sources, 147 (2005) 227-233.
Kleimann et al., "Formation of Wide and Deep Pores in Silicon by Electrochemical Etching", Materials Science and Engineering, B69-70 (2000) 29-33.
Kolasinski, Kurt W., "Silicon Nanostructures from Electroless Electrochemical Etching", Current Opinion in Solid State and Materials Science, 9 (2005) 73-83.
Komba et al., "Functional Interface of Polymer Modified Graphite Anode", Journal of Power Sources, 189, (2009), 197-203.
Komba et al., "Polyacrylate as Functional Binder for Silicon and Grapite Composite Electrode in Lithium-Ion Batteries", Electrochemistry, 79(1), (2010), 6-9.
Komba et al., "Polyacrylate Modifier for Graphite Anode of Lithium-Ion Batteries", Electrochemical and Solid-State Letters, 12(5), (2009), A107-A110.
Komba et al., "Study on Polymer Binders for High-Capacity SiO Negative Electrode of Li-Ion Batteries", Journal of Physical Chemistry, 115, (2011), 13487-13495.
Lang, Walter, "Silicon Microstructuring Technology", Materials Science and Engineering, R17 (1996) 1-55.
Lee et al., "Effect of Poly (Acrylic Acid) on Adhesion Strength and Electrochemical Performance of Natural Graphite Negative Electrode for Lithium-Ion Batteries", Journal of Power Sources, 161(1), (2006), 612-616.
Li et al., "A High Capacity Nano-Si Composite Anode Material for Lithium Rechargeable Batteries", Electrochemical and Solid-State Letters, 2 (11) (1999) 547-549.
Li et al., "Sodium Carboxymethyl Cellulose: A Potential Binder for Si Negative Electrodes for Li-Ion Batteries", Electrochemical and Solid-State Letters, 10(2) (2007), A17-A20.
Li et al., "The Crystal Structural Evolution of Nano-Si Anode Caused by Lithium Insertion and Extraction at Room Temperature", Solid State Ionics, 135 (2000) 181-191.
Liu et al., "A Novel Method of Fabricating Porous Silicon Material: Ultrasonically Enhanced Anodic Electrochemical Etching", Solid State Communications, 127 (2003) 583-588.
Liu et al., "Effect of Electrode Structure on Performance of Si Anode in Li-Ion Batteries: Si Particle Size and Conductive Additive", Journal of Power Source, 140 (2005) 139-144.
Liu et al., "Enhanced Cycle Life of Si Anode for Li-Ion Batteries by Using Modified Elastomeric Binder", Electrochemical and Solid-State Letters, 8(2) (2005), A100-A103.
Lu et al., "A Study of the Mechanisms of Erosion in Silicon Single Crystals Using Hertzian Fracture Tests", Wear, 186-187 (1995) 105-116.

(56) References Cited

OTHER PUBLICATIONS

Maranchi et al., "Interfacial Properties of the a-Si/Cu: Active-Inactive Thin-Film Anode Systems for Lithium-Ion Batteries", Journal of the Electrochemical Society: 153 (6) (2006) A1246-A1253.

Nakahata et al., "Fabrication of Lotus-Type Porous Silicon by Unidirectional Solidification in Hyrdogen", Materials Science and Engineering A 384 (2004) 373-376.

Niparko, J.K. (Editor), "Cochlear Implant Technology", Pub., Lippincott Williams and Wilkins, Philadelphia, (2000) 108-121.

Obrovac et al., "Structural Changes in Silicon Anodes During Lithium Insertion/Extraction", Electrochemical and Solid-State Letters, 7(5), (2004), A96-A96.

Ohara et al., "A Thin Film Silicon Anode for Li-Ion Batteries Having a Very Large Specific Capacity and Long Cycle Life", Journal of Power Sources, 136 (2004) 303-306.

Pei et al., "Silicon Nanowires Grown from Silicon Monoxide Under Hydrothermal Conditions", Journal of Crystal Growth, 289 (2006) 423-427.

Peng et al., "Dendrite-Assisted Growth of Silicon Nanowires in Electroless Metal Deposition", Adv. Funct. Mater., 13, No. 2 (2003) 127-132.

Peng et al., "Fabrication of Large-Area Silicon Nanowire p-n Junction Diode Arrays", Adv. Mater. (2004), vol. 16, No. 1, 73-76.

Peng et al., "Silicon Nanowires for Rechargeable Lithium-ion Battery Anodes", Applied Physics Letters (2008) vol. 93, No. 3, pp. 33105-1 to 33105-3.

Peng et al., "Simultaneous Gold Deposition and Formation of Silicon Nanowire Arrays", Journal of Electroanalytical Chemistry, 558 (2003) 35-39.

Peng et al., "Synthesis of Large-Area Silicon Nanowire Arrays via Self-Assembling Nanoelectrochemistry", Adv. Mater., 14, No. 16 (2002) 1164-1167.

Peng et al., "Uniform, Axial-Orientation Alignment of One-Dimensional Single-Crystal Silicon Nanostructure Arrays", Angew. Chem. Ind. Ed., 44 (2005) 2737-2742.

Peng, et al., "Fabrication of Single-Crystalline Silicon Nanowires by Scratching a Silicon Surface with Catalytic Metal Particles", Adv. Funct. Mater., 16 (2006), 387-394.

Qiu et al., "From Si Nanotubes to Nanowires: Synthesis, Characterization, and Self-Assembly", Journal of Crystal Growth, 277 (2005) 143-148.

Qiu et al., "Self-Assembled Growth and Optical Emission of Silver-Capped Silicon Nanowires", Applied Physics Letters, vol. 84, No. 19, (2004) 3867-3869.

Russo, et al., "A Mechanical Approach to Porous Silicon Nanoparticles Fabrication", Materials 2011, vol. 4, p. 1023-1033.

Sharma et al., "Thermodynamic Properties of the Lithium-Silicon System", J. Electrochem. Soc.: Electrochemical Science and Technology, vol. 123 (1976) 1763-1768.

Shin et al., "Porous Silicon Negative Electrodes for Rechargeable Lithium Batteries", Journal of Power Sources, 139 (2005) 314-320.

Sugama, et al., "Nature of Interfacial Interaction Mechanisms Between Polyacrylic Acid Macromolecules and Oxide Metal Surfaces", Journal of Materials Science, 19 (1984) 4045-4056.

Takami et al., "Silicon Fiber Formed on Silicon Without Using a Gas Process", Journal of Applied Physics, vol. 91, No. 12, 2-5 (2002).

Tokoro et al., "Anisotropic Etching Properties of Silicon in KOH and TMAH Solutions", Proceedings of the 1998 International Symposium on Micromechatronics and Human Science (1998) 65-70.

Tsuchiya et al., "Structural Fabrication Using Cesium Chloride Island Arrays as a Resist in a Fluorocarbon Reactive Ion Etching Plasma", Electrochemical and Solid-State Letters, 3 (1) (2000) 44-46.

Ui et al., "Improvement of Electrochemical Characteristics of Natural Graphite Negative Electrode Coated With Polyacrylic Acid in Pure Propylene Carbonate Electrolyte", Journal of Power Sources, 173(1), (2007), 518-521.

Wagner et al., "Vapor-Liquid-Solid Mechanism of Single Crystal Growth", Applied Physics Letters, vol. 4, No. 5 (1964) 89-90.

Wen et al., "Chemical Diffusion in Intermediate Phases in the Lithium-Silicon System", Journal of Solid State Chemistry, 37 (1981) 271-278.

Weydanz et al., "A Room Temperature Study of the Binary Lithium-Silicon and the Ternary Lithium-Chromium-Silicon System for use in Rechargeable Lithium Batteries", Journal of Power Sources, 81-82 (1999) 237-242.

Winter, et al., "Insertion Electrode Materials for Rechargeable Lithium Batteries", Advanced Materials, 1998, 10, No. 10.

Wong et al., "Controlled Growth of Silicon Nanowires Synthesized Via Solid-Liquid-Solid Mechanism", Science and Technology of Advanced Materials, 6 (2005) 330-334.

Yabuuchi et al., "Graphite-Silicon-Polyacrylate Negative Electrodes in Ionic Liquid Electrolyte for Safer Rechargeable Li-Ion Batteries", Advanced Energy Materials, 1, (2011), 759-765.

Yan et al., "Growth of Amorphous Silicon Nanowires via a Solid-Liquid-Solid Mechanism", Chemical Physics Letters, 323 (2000) 224-228.

Yan et al., "$H_2$-Assisted Control Growth of Si Nanowires", Journal of Crystal Growth, 257 (2003) 69-74.

Ye et al., Controllable Growth of Silver Nanostructures by a Simple Replacement Reaction and Their SERS Studies, Solid State Sciences 11 (2009), p. 1088-1093.

Yoshio et al., "Electrochemical Behaviors of Silicon Based Anode Material", Journal of Power Sources, 153 (2006) 375-379.

Zhang et al., "A Review on Electrolyte Additives for Lithium-Ion Batteries", Journal of Power Sources, 162(2), 1379-1394, (2006).

Zhang et al., "Bulk-Quantity Si Nanowires Synthesized by SiO Sublimation", Journal of Crystal Growth, 212 (2000) 115-118.

Zhang et al., "Catalytic Growth of x-$FiSi_2$ and Silicon Nanowires", Journal of Crystal Growth, 280 (2005) 286-291.

Zhang et al., "Synthesis of Thin Si Whiskers (Nanowires) Using $SiCl_4$", Journal of Crystal Growth, 2006 (2001) 185-191.

International Search Report dated Dec. 6, 2011 for App. PCT/GB2011/001299.

Written Opinion dated Dec. 6, 2011 for App. PCT/GB2011/001299.

Uzun, Orhan et al., "Production and Structure of Rapidly Solidified Al-Si Alloys", Turk J Phys, 25, pp. 455-466 (2001).

"Peng Yun, et al. "Comparative Analysis of Two Different Treatment Technology in PCB Spent Etching-Cyclic Regeneration Technique and Copper Sulfate Processing Technique", Printed Circuit Information, No. 7, pp. 51-53, dated Jul. 10, 2007."

\* cited by examiner

ELECTROACTIVE MATERIAL

The present invention relates to an electroactive material comprising silicon; the use of such a material in the preparation of an electrode; an electrode including the electroactive silicon material of the invention; the use of an electrode in the preparation of an electrochemical cell and to an electrochemical cell or battery including such an electrode.

The use of silicon as an active anode material in secondary batteries such as lithium ion batteries is well known. Early forms of these lithium ion batteries were prepared using bulk silicon electrodes, thin film silicon electrodes and silicon powder electrodes. Subsequently, silicon comprising electrodes including silicon comprising pillars, rods, fibres and wires have been prepared. Silicon comprising particles having a surface array of pillars have also been used in the fabrication of lithium ion batteries. US 2008/0241647 discloses a cylindrical lithium battery comprising silicon or silicon alloy particles having dimensions in the range 5 μm to 15 μm. According to US 2008/0241647, batteries including silicon particles having dimensions outside this range exhibit inadequate performance; particles with diameters of less than 5 μm give batteries with inadequate capacity, whereas batteries including particles having diameters greater than 15 μm exhibit inadequate mechanical properties due to stresses arising from the expansion and contraction of the silicon material during the charge and discharge cycles of the battery. The particles used in the cylindrical batteries of US 2008/0241647 are prepared by chemical vapour deposition of silane onto seeded polycrystalline silicon. These particles are characterised by the presence of crystallites with dimensions of between 30 and 100 nm. The polycrystalline nature of these particles means that each particle includes a large number of grain boundaries.

US 2009/0253033 discloses an anode active material suitable for use in lithium ion secondary batteries. The anode material comprises silicon or silicon alloy particles with dimensions of between 500 nm and 20 μm. These particles are manufactured using techniques such as vapour deposition, liquid phase deposition or spraying techniques.

U.S. Pat. No. 6,334,939 and U.S. Pat. No. 6,514,395 each disclose silicon based nano-structures for use as anode materials in lithium ion secondary batteries. Such nano-structures include cage-like spherical particles, rods or wires having nanoscale dimensions. Rods or wires having diameters in the range 1 to 50 nm and lengths in range 500 nm to 10 μm can be prepared by laser ablation using an iron catalyst. Other techniques such as solution synthesis and chemical vapour deposition are also disclosed as being useful. Iron Germanium alloy nanostaictures comprising a mixture of particles having a dimension in the range 1 to 50 nm and micron length rods having a diameter in the range 5 to 30 nm can also be prepared using laser ablation. Similar nanostructures are disclosed in U.S. Pat. No. 6,334,939 and ZL 01814166.8. JP 04035760 discloses silicon based anode materials comprising carbon-coated silicon fibres having diameters in the range 10 nm to 50 μm for use in lithium ion secondary batteries.

US 2007/0281216 discloses an anode active material for a lithium secondary battery comprising a mixture of silicon nano-particles, graphite, carbon black and a binder. The silicon nano-particles comprise either thread-like particles having a primary particle size in the range 20 to 200 nm and a specific surface area of 11 $m^2/g$ or spherical particles having a primary particle size in the range 5 to 50 nm and a specific surface area of 170 $m^2/g$. The silicon particles and threads are prepared using techniques such as chemical vapour deposition. Anodes exhibiting a capacity of up to 1000 mA/g over 50 cycles are illustrated. The life of the battery is significantly increased if the battery is operated at a limited voltage level.

US 2010/0143798 discloses a solid nano-composite particulate composition for use in lithium ion batteries. The nano-composite particles comprise an electroactive material in the form of fine particles, rods, wires, fibres and tubes; nano-graphene platelets and a protective matrix. The electro-active material includes silicon comprising nano-structures having a typical diameter of 60 nm. Solid nano-composite particles were prepared by dispersing a mixture of the electro-active material and nano-graphene platelets having an average diameter of 60 nm in a polymeric matrix and spray drying the resulting mixture to produce nano-composite particles having an average diameter in the range 1 μm to 5 μm.

US 2008/0261112 discloses an electrode material including an electroactive material comprising a mixture of silicon comprising particles and nano-wires. The nano-wires are entangled to form a network, which is in contact with the particles. The electroactive composition is prepared by placing a silicon comprising material in a thermal plasma at a temperature of between 600 and 1500° C. to give a composition comprising a mixture of silicon comprising particles having a diameter of about 5 μm and silicon comprising fibres having a diameter in the range 30 to 50 nm. The components of the compositions become both entangled with and fused to adjacent components during the fabrication process. Further, the fabrication process means that the composition as a whole is fused to the current collector and anodes prepared in the way do not include additional components such as a binder or a conductive additive. Although it is alleged that these compositions are able to both accommodate silicon expansion during lithium intercalation and reduce the build up of an irreversible capacity over the lifetime of the cell, the diameter of the nano-wires present in the composition mean that they have a relatively high surface area and it is expected that the compositions of US 2008/0261112 will exhibit a relatively high first cycle loss as a result of SEI (Surface Electrolyte Interphase) formation. In addition the fused nature of the composition is expected to result in the build up of heave over the lifetime of the cell, leading to delamination of the electrode material, an undesirable increase in cell volume and a potentially hazardous build up of pressure.

U.S. Pat. No. 7,767,346 discloses an electroactive particulate material comprising a porous composite of carbon and silicon prepared by pulverising a mixture of silicon metal, a carbon source such as polyvinyl alcohol and a pore forming agent such as oxalic acid in a ball mill and then sintering the pulverised mixture at a temperature of between 700 and 1000° C. for 10 hours to give a composite structure comprising a network of carbon coated silicon fibres and powders. This networked structure is then further pulverised to give the electroactive particulate material, which can be combined with graphite and a binder to prepare anodes for inclusion in a lithium ion battery. It will be appreciated that electrode structures comprising these materials do not comprise a network of silicon fibres and particles extending over the entirety of the electrode structure; the electrode comprises islands of network like composite particles distributed within a matrix of binder and graphite.

US 2009/0269677 discloses an electrode material comprising a three dimensional structure of metal fibres having a plurality of anode active particles distributed therein. The metal fibres are selected from the group comprising titanium, iron, copper, silver, aluminium, zinc, cobalt, nickel and chromium and typically have a diameter in the range 500 nm to 50 µm and an aspect ratio (ratio of the length to the diameter of the fibre) of greater than 2. The anode active particles typically comprise silicon comprising particles having a diameter in the range 0.1 to 30 µm. Electrode structures having a porosity in the range 20 to 95% and a tensile strength in the range 0.1N/mm to 168N/mm are prepared by dipping a structure comprising a network of metal fibres in a solution of electro-active particles. The metal network structure may be in the form of a free standing network or may be applied to a substrate such as a copper current collector. The fibre/powder electrode thus produced can be used in the fabrication of lithium ion batteries.

The silicon structures described above have been prepared using a variety of techniques. For example, the use of epitaxial and non-epitaxial vapour growth techniques in the production of silicon nano-wires having cross-sectional diameters in the range 20 to 500 nm and aspect ratios of greater than 10, 50 or 100 is disclosed in U.S. Pat. No. 7,273,732.

An alternative approach to using the epitaxial, solution and chemical vapour deposition techniques taught in the above-mentioned documents for the production of silicon fibres, pillars or rods is disclosed in U.S. Pat. No. 7,402,829; WO 2007/083155; WO 2007/083152; WO 2009/010758 and WO 2010/040985. U.S. Pat. No. 7,402,829 discloses the use of island lithography and etching for fabricating silicon pillars on a silicon substrate and using the integrated structure in an anode. Such pillars have diameters in the range 0.1 to 1 µm and lengths in the range 1 to 10 µm. WO 2007/083155 discloses how to prepare silicon fibres for an anode that have been detached from a silicon substrate etched using a similar technique. This produces fibres with a diameter in the range 0.05 to 0.5 µm and a length in the range 20 to 300 µm.

WO 2007/083152 uses an alternative nucleation and etching process for the preparation of silicon based pillars and fibres having a diameter in the range 0.2 to 0.6 µm. The length of the pillars or fibres depends upon whether the etching step is carried out in the same solution as the solution in which nucleation occurred. If the etching step is carried out in a separate solution, fibre lengths of 70 to 75 µm are observed. If the etching step is carried out in the same solution, fibre lengths of 20 to 100 µm, typically 85 to 100 µm are observed.

WO 2009/010758 discloses a method for preparing silicon fibres or pillars detached from etched metallurgical grade silicon granules having diameters in the range 10 µm to 1 mm as starting materials. The silicon granules are etched to produce particles bearing pillars or fibres having a diameter in the range 0.1 to 0.5 µm and a length in the range 4 to 100 µm. The pillars or fibres are then detached from the granule substrate and can be used in the fabrication of lithium ion batteries.

An additional suitable etching method is disclosed in WO2010/040985. It should be noted that the fibres or pillars produced using the etching techniques described above are typically single crystal structures, which are devoid of individual crystallites and therefore grain boundaries, or they are polycrystalline with only a few grains.

WO 2009/010758 and WO 2009/010757 describe methods of fabricating anode active materials using detached fibres of the type disclosed above. These fibres can be used as the electrochemically active material in an anode of a lithium ion secondary battery. Often these fibres or wires form part of a composite material (usually known as an anode mix) used in the fabrication of an anode. The anode mix may include other components such as a binder, a conductive carbon material and optionally graphite (or other electroactive forms of carbon). This anode mix is typically mixed with a solvent and/or water to create a slurry, which is applied to a thin metal foil, such as copper foil, to a predetermined layer thickness and then allowed to dry. This process produces an entangled "felt" or "mat" of silicon fibres, which are randomly connected with each other either directly or indirectly through the other components of the mix, and are also connected with the copper foil which acts as the current collector of the electrode. Anodes fabricated according to the methods described above can be incorporated into lithium ion batteries. During the first charge-discharge cycle of a battery including an anode of the type described above, the silicon fibres will tend to fuse together where they touch each other, strengthening the connectivity of the felt. By the term connected it should be understood to mean, in relation to the present invention, that each of the silicon comprising elements from which the felt or mat are constructed are in electrical contact, either via physical connections or interfaces, with the electrolyte and optionally with one or more other electroactive elements and/or one or more conductive elements that may be present in the mix as well as the current collector. During operation of the cell, it is essential that all the electroactive elements in the anode are connected to at least one other electroactive element and/or to at least one conductive element such that they form a network with a low resistance to the movement of both electrons and ions and provide an efficient interface between the electrolyte and the current collector.

As disclosed in WO 2009/010757, silicon fibres can also be formed into a felt or a mat and bonded together either through the application of heat and pressure or by providing the fibres with a metallic bridging element, prior to the first charge-discharge cycle of the anode. WO 2009/010758 further discloses that a felt comprising silicon fibres can be formed by directly bonding the silicon to the current collector. Felts comprising bonded fibres exhibit improved conductivity compared to non-bonded materials because of the increased connectivity between the fibres.

It is well known that a random arrangement of spheres has a maximum packing density of 64% (the Bernal sphere packing factor); in other words the randomly arranged spheres cannot fill more than 64% of a fixed volume. In fact every particle shape has its own unique, size invariant maximum random packing density. As disclosed in "Improving the Density of Jammed Disordered Packings Using Ellipsoids" by A. Donev, I. Cisse, D. Sachs, E. A. Variano, F. H. Stillinger, R. Connelly, S. Torquato and P. M. Chaikin, Science February 2004, pp 990-993, particles such as spheroids and ellipsoids with low aspect ratios can have higher random packing densities, in excess of 70%, but for high aspect ratio particles the maximum random packing density decreases. As disclosed in "Random packings of spheres and spherocylinders simulated by mechanical contraction" by S. R. Williams and A. P. Philipse, Phys. Rev. E, 67, 051301, 2003, the maximum random packing density of stiff rods with high aspect ratios (e.g. >10) appears to vary approximately as 5 divided by the aspect ratio. For example, this predicts that stiff rods of diameter 100 nm and length 10 µm would theoretically have a maximum random packing density of approximately 5 divided by the aspect ratio of 100, or approximately 5%.

US 2009/117466 discloses compositions for use as anode materials in a lithium ion secondary battery, the composition comprising a mixture of micron or nano-meter scaled electroactive particles such as silicon or aluminium and graphite flakes. Anodes comprising these compositions are allegedly characterised by reduced fragmentation of electrode material and better cycling stability.

WO 2007/136164 discloses anode compositions comprising composite particles, each composite particle comprising nano-particles of an electroactive material such as silicon, tin, aluminium, germanium or lead surrounded by graphite flakes. Either the void space between the nano-particles and the flakes and/or the surface of the composite particle can be filled or covered with amorphous or soft carbon. Compositions Including these composite particles allegedly exhibit good conductivity and improved low temperature and cycling characteristics.

WO 2008/139157 discloses anode materials for lithium ion batteries, the anode materials comprising silicon based structures selected from tubes, threads, fibres, flakes and ribbons. These silicon structures allegedly increase conductivity within an anode composition, reduce delamination of the anode material and increase cycle life.

It has been observed that the initial felt structures (both bonded or unbonded) produced using the silicon based fibre products obtained from the etching techniques described above have an inherent porosity, (that is they contain voids or spaces between the fibres) which arises as a result of the maximum attainable packing density that can be obtained for a random arrangement of fibres within a defined volume. However, the silicon fibres as described above are able to flex or bend to a limited extent. This flexibility together with the aspect ratio of the silicon fibres produces electrode or anode materials having a higher packing density compared to electrode or anode materials prepared from rigid silicon rods described in the prior art, for example. It will be appreciated, therefore, that the porosity of an anode material comprising nano-structured silicon will depend, to a large extent, on the shape and relative proportions of the silicon nano-structures from which the material is formed.

The inherent porosity (pores or voids) in the electrode structure provides the silicon fibres with space into which they can expand in response to the intercalation or insertion of lithium that occurs during the charging cycle of the battery. These pores or voids also provide a route for the electrolyte to penetrate the whole of the electrode structure, which means that the electrolyte will be in contact with as much of the surface of the silicon material as possible during charging and discharging of the anode. This porosity is important as it provides a path by which the lithium can be intercalated into the bulk of the silicon material so that the lithiation of the silicon is as uniform as possible throughout the anode mass. However, the presence of an excessive number of pores within the anode structure means that the mass of anode active material per unit area is generally low compared to bulk silicon anodes or anode materials prepared using more closely packed particulate silicon, for example. This means that the inherent capacity of the anode is also correspondingly less.

A further problem that has been observed for anode structures comprising silicon fibres, rods and wires is an effect known as "heave" in which the silicon fibres making up the bulk of the silicon electrode material expand as an aggregate body away from the surface of the current collector during lithium intercalation rather than expanding substantially independently into the pores or voids present in the uncharged composite. Heave causes a temporary increase in the thickness of the electrode, which may increase the internal stresses within the battery. Although this bulk does appear to survive the heave process and is able to substantially resume its original configuration on release of the lithium from the silicon fibres initially, over time de-lamination of the anode material may occur. Further, the methods and costs associated with the manufacture of these silicon structures are generally involved and not cost effective and further refinement of these production methods with a view, in particular, to a reduction in the costs associated therewith is needed. There is a need, therefore, for a silicon-based electroactive material that addresses the problems of the prior art outlined above. In particular there is a need for a silicon based electroactive material that is at least able to accommodate one or more of the stresses arising from the expansion and contraction of the material during the charging and discharging phases of the battery and which also has an improved capacity performance, a longer cycle life and a more cost-efficient method of manufacture compared to the fibre-containing anode materials of the prior art. The present invention addresses that need.

A first aspect of the invention comprises a composition comprising a plurality of elongate elements and a plurality of particles, the elongate elements and particles each comprising a metal or semi-metal selected from one or more of the group comprising silicon, tin, germanium and aluminium or mixtures thereof, characterised in that
 a. the elongate elements are selected from one or more of the group comprising fibres, tubes, threads, ribbons and flakes and
 b. the particles are selected from one or more of the group comprising pillared particles, porous particles and porous particle fragments.

In one embodiment of the first aspect of the invention the composition is modified in that
 a. the elongate elements are selected from one or more of the group comprising fibres having a diameter in the range 100 nm to 500 nm, tubes, ribbons and flakes; and
 b. the particles comprise native silicon particles.

In a further embodiment of the first aspect of the invention the composition is modified in that
 a. the elongate element is a pillared particle having a an overall diameter in the range 20 µm to 30 µm and pillar lengths of up to 10 µm; and
 b. the particles are selected from one or more of the group comprising native particles, porous particles and porous particle fragments.

Compositions of the type described herein are electroactive and can be used in the fabrication of electrodes for use in batteries such as lithium ion batteries, sodium ion batteries or magnesium ion batteries, for example. It should be understood that although the invention relates, in general, to compositions including elongate elements and particles comprising a metal or semi-metal selected from one or more of silicon, tin, germanium and aluminium, it will be specifically described herein with reference to compositions comprising elongate elements and particles in which the metal or semi-metal is a silicon comprising material selected from the group comprising substantially pure silicon, a silicon alloy or a material selected from the group comprising silicon oxide, silicon nitride and silicon boride providing the silicon comprising material is electroactive.

The term "silicon comprising material" as used herein should be understood to mean that the material consists, comprises or includes silicon within its structure. Further, it should be appreciated, therefore, that the scope of the invention is not limited to silicon comprising materials as defined above but extends to compositions comprising elongate elements and particles comprising, consisting or including a metal or semi-metal selected from one or more of the group comprising tin, germanium and aluminium and mixtures thereof. Such compositions may also be referred to as compositions comprising metal or semi-metal comprising elongate elements and metal or semi-metal comprising particles respectively. It will be appreciated that, as specified herein above, the metal or semi-metal may suitably be provided in a substantially pure form, in the form of an alloy or in the form of an oxide, nitride or boride as described above. In this respect all references to "silicon comprising elongate elements" and "silicon comprising particles" should be interpreted to include elongate elements consisting, comprising and including a metal or a semi-metal respectively. Although the invention will be specifically described in relation to "silicon comprising elongate elements" and "silicon comprising particles" it should be understood that the scope of the invention extends to include elongate elements and/or particles consisting, comprising or including elements other than silicon. In this respect, the elongate elements and particles of the first aspect of the invention will hereafter be specifically referred to as "silicon comprising elongate elements" and "silicon comprising particles" respectively.

For the avoidance of doubt, it should be appreciated that the silicon comprising elongate elements and silicon comprising particles included in the composition according to the first aspect of the invention may include solid elongate elements, solid particles, hollow tubes and porous and hollow particles respectively formed from a single silicon-comprising material, solid elongate elements, solid particles, tubes and porous and hollow particles having a silicon comprising coating provided on a core other than silicon and solid elongate elements, solid particles, tubes and porous and hollow particles having a core comprising a first silicon comprising material and a coating comprising a second silicon comprising material. Where the silicon comprising elongate elements and particles comprise a silicon coating, the cores of these coated elements can be selected from materials such as carbon, a suitably conductive metal such as copper, nickel, aluminium or gold; a conductive ceramic or a silicon comprising material having a different composition to the silicon comprising material used for the coating. Preferred cores include carbon based cores such as hard carbon or graphite or a suitable metal. The silicon comprising materials used to form the elongate elements, tubes and particles of the composition according to the first aspect of the invention can include a substantially pure silicon, a silicon-alloy or a ceramic type silicon material selected from the group comprising silicon oxide, silicon boride and silicon nitride. A substantially pure silicon will suitably have a purity of from 90% to 99.999%, preferably 90% to 99.99%, more preferably 90% to 99.95% and especially 95% to 99.95% and will include high purity silicon used in the manufacture of semi-conductors as well as metallurgical grade silicon such as the Silgrain® material produced by Elkem of Norway. A substantially pure silicon may include impurities to further improve the conductivity of the material. Suitable desirable impurities include boron, nitrogen, tin, phosphorous, aluminium and germanium. The impurities are preferably present in an amount up to 1% by weight of the silicon, which provides a balance between cost and performance. Suitable silicon-alloys comprise 50 to 90 wt % silicon. The composition of the first aspect of the invention is an electroactive material that is able to form an alloy with lithium and which can also be used in the fabrication of electrodes, preferably anodes for use in lithium ion secondary batteries or batteries based around alternative ions as the charge carrier, for example sodium ion or magnesium ion batteries. By the term "electroactive material" it should be understood to mean that the material is able to accommodate and release lithium or other alkali ions, or magnesium ions from its structure during the charging and discharging cycles of a battery. The silicon comprising elongate elements may comprise discrete elongate elements only or may include structures in which the elongate element includes a silicon comprising particle in its structure.

The silicon comprising particles and elongate elements of the first aspect of the invention are preferably formed into a felt-like structure or mat in which the fibres and particles are either randomly entangled or are in the form an ordered arrangement within the composition. Preferably the elongate elements and particles are randomly entangled. Such entanglement results in a structure in which the elongate silicon comprising elements and silicon comprising particles are randomly connected with each other, either directly or indirectly through any other components present in the composition. By the term connected it should be understood to mean, in relation to the present invention, that each of the silicon comprising elements from which the felt or mat are constructed are in electrical contact, either via physical connections or interfaces, with the electrolyte and optionally with one or more other electroactive elements and/or one or more conductive elements that may be present in the mix as well as the current collector. It should be understood that the inclusion of the elongate elements of high aspect ratio significantly increases the potential number of connection points between elements in the mix, whilst the inclusion of structurally simpler particles can reduce the overall manufacturing cost per unit mass. The inclusion of particles also increases the mass of silicon present in the electrode structure, thereby increasing the capacity of an electrode comprising this mixture relative to that of an electrode comprising elongate elements only. The felt like structure or mat can be formed as a layer on a current collector such as copper foil or can be in the form of a free standing felt or mat and can be used in the fabrication of electrodes, preferably anodes for use in lithium ion batteries. It should be appreciated that the entanglement of the elongate elements and particles of the first aspect of the invention results in the formation of a network of elongate elements and particles that extends across the entirety of a substrate, such as a copper current collector. Without wishing to be constrained by theory, it is believed that the formation of an extended network of elongate elements and particles over the surface of the current collector improves both the connectivity within an electrode structure compared to known electrodes and the cycle life. In a preferred embodiment of the first aspect of the invention, the composition may optionally include, in addition to the silicon elements, one or more additional components selected from the group comprising a binder, a conductive material and a non-silicon comprising electroactive material, such as graphite. It is particularly preferred that the compositions of the first aspect of the invention include a binder since it is the binder, which binds, adheres or connects the elongate elements and particles of the composition to the current collector. In an especially preferred embodiment of the first aspect of the invention there is provided a composition comprising a plurality of silicon comprising elongate elements, a plurality of silicon comprising particles and a binder; such a composition is also known as a composite electrode or anode material, since it is this material that is connected to a current collector during the fabrication of composite electrodes, preferably composite anodes. Additional components selected from the group comprising a conductive material, a viscosity adjuster, a filler, a cross-linking accelerator, a coupling agent and an adhesive accelerator may optionally be added to the especially preferred embodiment according to the first aspect of the invention. These additional components are generally referred to as non-silicon comprising components. These non-silicon comprising components generally comprise carbon as a major constituent, but may comprise silicon as a minor constituent.

By the term "electrode material" it should be understood to mean a material comprising an electroactive material, which can be applied, bonded or connected to a current collector. By the term "composite electrode material" it should be understood to mean a material comprising a mixture, preferably a substantially homogeneous mixture, of an electroactive material, a binder and optionally one or more further ingredients selected from the group comprising a conductive material, a viscosity adjuster, a filler, a cross-linking accelerator, a coupling agent and an adhesive accelerator. The components of the composite material are suitably mixed together to form a homogeneous composite electrode material that can be applied as a coating to a substrate or current collector to form a composite electrode layer. Preferably the components of the composite electrode material are mixed with a solvent to form an electrode mix, which electrode mix can then be applied to a substrate or current collector and dried to form the composite electrode material.

By the term "electrode mix" it should be understood to mean compositions including a slurry or dispersion of an electroactive material in a solution of a binder as a carrier or solvent. It should also be understood to mean a slurry or dispersion of an electroactive material and a binder in a solvent or liquid carrier.

Further the term "composite electrode" should, in the context of the present invention, be understood to mean an electrode structure comprising a current collector having an electroactive material or a composite electrode material applied, bonded, adhered or connected thereto. The current collector may be provided in the form of a sheet or a mesh. The electroactive material may be in the form of a coating applied thereto. The coating may be provided in the form of a felt or a mat, the felt or mat being applied, bonded, adhered or connected to the current collector.

It will be appreciated, therefore, that the total volume of the electrode or anode material, $V_T$ (either in the form of a freestanding felt or mat or in the form of a layer applied to a current collector) can be expressed in terms of the volume taken up by the solid elements such as silicon, graphite, conductive material and binder that may be present in the material as well as the volume defined by the empty spaces generated within the material as a result of the random packing of the solid elements. The total volume can therefore be expressed as follows:

$$V_T = V_{Si} + V_B + V_C + V_G + V_P$$

Where $V_T$ is the total volume of the anode material; $V_{Si}$ is the total volume of electro-active silicon elements in the anode material; $V_B$ is the total volume of the binder; $V_C$ is the total volume of conductive material (where present, $V_G$ is the total volume of additional electroactive material (such as graphite, where present) and $V_P$ is the total volume occupied by the pores or voids within the anode material. The total pore volume, $V_P$, of a material is otherwise known as the porosity and can be expressed as a percentage of the total volume $V_T$.

It will be further appreciated that because the volume of the silicon-comprising material expands by a factor of up to approximately 400% when the material is charged, the porosity of the electrode decreases. Without being constrained by theory, it is believed that the total porosity of the electrode in the charged state at first cycle should be in the range 20 to 30%, preferably 25% to ensure that access of the electrolyte to the components of the material is not inhibited in this charged state. The porosity of the electrode may decrease over the lifetime of a cell including the electrode due to the build up of SEI layers on the surface of the silicon particles and elongate elements and loss of cohesiveness within the composite structure.

Without wishing to be further constrained by theory, the porosity of the uncharged material will depend, in part, on the nature of the components used in the formation of the anode material and the relative proportions in which they are present. It is important, however, that the nature of the components and the relative proportions in which they are present is sufficient to achieve a porosity of between 20 and 30% when the material is in the charged state. The material will typically have a porosity of between 35 and 80% in the uncharged state, preferably between 40 and 75%.

The anode porosity, $V^u_{Sig}$, of an uncharged anode mix comprising an electroactive material consisting of both silicon comprising and a further non-silicon comprising electroactive material can be reduced relative to the anode porosity, $V^u_{Si}$, of an uncharged anode mix of equivalent volume comprising an electroactive material comprising only silicon comprising material, so that the porosity in the charged state is the same in both cases when the silicon is lithiated to the same capacity value. This reduction in porosity in the uncharged state can be expressed as follows:

$$V^u_{Si} - V^u_{Sig} = V_G(1 - 1/\alpha)$$

where $V^u_{Sig}$, is the volume occupied by pores in an uncharged material comprising an electroactive material comprising an electroactive material comprising silicon and a further non-silicon comprising electroactive material, $V^u_{Si}$ is the volume occupied by pores in an uncharged material comprising an electroactive material comprising silicon only, $V_G$ is the volume of the additional electroactive material, and $\alpha$ is the average volume expansion factor of the silicon-comprising electroactive material (in other words, the volume V of the silicon comprising electroactive material increases to $\alpha V$ at the end of the charge cycle with the insertion of lithium ions). This calculation assumes that the silicon comprising electroactive material has the same volume expansion factor in each case, that the volume expansion of the further electroactive material is minimal and can be neglected and that the porosity of each anode mix in the final charged state is the same.

Without wishing to be still further constrained by theory, it is believed that the overall structure of the material of the first aspect of the invention and hence its electrical and mechanical properties will depend upon the relative dimensions, volumes and shapes of all the components (silicon and non-silicon comprising components) from which the material is formed as well as the proportions in which they are present. Where the material comprises a plurality of elongate elements and a plurality of particles having diameters that are no more than three times larger than the diameter of the elongate elements, it is believed that the particles will tend to be dispersed within the voids created by the random entanglement of the elongate elements and the resulting structure will have a relatively high capacity. It will be appreciated that it is not desirable for a particle to occupy the entire space of a void within the felt structure, since this would otherwise inhibit the expansion of the silicon comprising elongate elements and particles within the structure and lead to stresses within and buckling of the electrode material. A particle will most preferably occupy between 5 and 50% of the volume of each pore, so that expansion of the silicon material due to intercalation of lithium ions can be accommodated. However it is advantageous for the particles to stay conductively connected to the elongate elements and therefore they should not be too small. Furthermore as the particle diameter decreases, the surface area to volume ratio of the particle increases causing a higher amount of Solid Electrolyte Interphase (SEI) material to be formed during charging which reduces the cycling efficiency. Therefore the diameter of the particles is preferably at least as large as the diameter of the elongate elements.

Without wishing to be constrained by theory, it is believed that where the material includes particles having diameters that are significantly larger, for example more than a factor of three larger, than those of the elongate elements, then the dispersal of particles and elongate fibres will depend upon the length of the elongate elements relative to the diameter of the fibres. If the average length of the elongate elements is less than half the particle diameter, these elongate elements will tend to be dispersed within the voids created by the particles and the elongate element volume should exceed the inter-particle volume that would exist in a packed particle-only mix to maintain good connectivity.

Without wishing to be further constrained by theory it is believed that where the length of the elongate element is greater than half the particle diameter, the elongate elements will tend to occupy space between adjacent particles rather than the inter-void space created by particles and result in a structure in which the inter-particle contact is minimised. The actual structure will depend upon the relative ratio of the volume of elongate elements to the volume of particles present in the structure. Where the volume of elongate elements exceeds that of the particles, the structure of composition comprises a network in which islands of particles are distributed within a matrix of elongate elements.

Compositions in which either the elongate elements partially fill the voids between particles or which comprise a network in which islands of particles are distributed within a matrix of elongate elements results in the formation of anodes, which exhibit better cycle-ability compared to an anode comprising silicon comprising particles only; it is believed that this is because the composition of the present invention is better able to accommodate the stresses arising from the intercalation of lithium, whilst maintaining a good connectivity between all the elements in the mix compared to an anode mix comprising silicon comprising particles only. The partial filling of the pores or voids in the electrode structure means that it also exhibits good capacity characteristics, higher than that attained with anode mixes comprising only elongate elements with a limit on the maximum achievable packing density. The materials of the first aspect of the invention are therefore able to exhibit good capacity characteristics over a prolonged period of time.

As disclosed above, the compositions of the present invention comprising a plurality of silicon comprising elongate elements and a plurality of silicon comprising particles can be used to fabricate electrode or anode materials. The electrodes or anodes so prepared are characterised by good connectivity both within the material itself and between the material and the electrolyte and current collector respectively, good capacity performance over a prolonged number of cycles and a reduced manufacturing cost due to the low cost of the materials used. An electrode or anode mix or material (composition) according to the first preferred embodiment of the first aspect of the invention will suitably comprise 50 to 90% of an electroactive material by weight, preferably 60 to 80% and especially 70 to 80%. The electroactive material suitably comprises the silicon comprising elongate elements and silicon comprising particles according to the first aspect of the invention and optionally a further material that is also electroactive. Examples of further electroactive materials are provided herein.

The elongate silicon comprising electroactive elements can be selected from one or more structures selected from the group comprising fibres, tubes, ribbons and flakes. By the term "fibre" it should be understood to mean an element defined by two smaller dimensions and one larger dimension, the aspect ratio of the larger dimension to the smallest dimension being in the range 5:1 to 1000:1. Elongate elements having an aspect ratio of 40:1 to 100:1 are preferred. In this respect the term "fibre" may be used interchangeably with the terms pillars, threads and wires. As indicated above, where the material according to the first aspect of the invention includes a silicon comprising fibre, this fibre preferably has a diameter in the range 50 to 2000 nm, preferably 50 to 1000 nm, more preferably 100 nm to 500 nm, most preferably 150 nm to 200 nm and especially 100 to 350 nm. Silicon fibres or elongate elements having a diameter of from 150 nm to 200 nm are especially preferred. Silicon fibres having a diameter of 50 nm or less are not preferred as their small diameter means that they have a large surface area to volume ratio, which results in capacity loss due to the build up of an SEI layer during the charging phases of the battery. Silicon comprising fibres of the first aspect of the invention suitably have a length in the range 0.8 $\mu$m to 100 $\mu$m, preferably 1 $\mu$m to 50 $\mu$m, more preferably 2 $\mu$m to 40 $\mu$m and especially 10 to 15 $\mu$m. A first embodiment of the first aspect of the invention the elongate element has a diameter of from 150 nm to 200 nm and a length of from 10 to 15 $\mu$m. The term elongate element also includes a particle having one or more pillars provided on the surface thereof, where the pillars have a length in the range 1 to 100 $\mu$m. Such pillars may be formed integrally with the particle core in or may be formed independently of the particle core. Silicon-comprising pillared particles having an overall diameter of 20 to 30 $\mu$m, preferably 25 $\mu$m and pillar lengths of up to 10 $\mu$m, preferably 4 to 6 $\mu$m are preferred.

Alternatively, where the silicon comprising elongate elements comprise ribbons, tubes or flakes, these are each suitably defined by three separate dimensions. The ribbon includes a first dimension, which is smaller in size than the other two dimensions; a second dimension, which is larger than the first dimension and a third dimension, which is larger than both the first and second dimension. The flake includes a first dimension, which is smaller in size than the other two dimensions; a second dimension, which is larger than the first dimension and a third dimension, which is similar to or marginally larger than the second dimension. The tube includes a first dimension, the tube wall thickness, which is smaller in size than the other two dimensions, a second dimension, the outer diameter of the tube wall, which is larger than the first dimension and a third dimension, the tube length, which is larger than both the first and second dimension. For ribbons, tubes and flakes, the first dimension is suitably of the order of 0.08 $\mu$m to 2 $\mu$m, preferably 0.1 $\mu$m to 0.5 $\mu$m. The second dimension is suitably at least two or three times larger than the first dimension for ribbons and between 10 and 200 times the first dimension for flakes and between 2.5 and 100 times the first dimension for tubes. The third dimension should be 10 to 200 times as large as the first dimension for both ribbons and flakes and between 10 to 500 times as large as the first dimension for tubes. The total length of the third dimension may be as large as 500 µm, for example.

Elongate elements including ribbons having a thickness in the range 0.08 µm to 1 µm, a width in the range 240 nm to 300 nm, a length in the range 0.8 µm to 20 µm and an aspect ratio in the range 10:1 to 200:1. Ribbons having a thickness of 0.25 µm, a width of 0.5 µm and a length of 50 µm are particularly preferred. Where the elongate elements include flakes, these may have a thickness in the range 80 nm to 100 nm, a width in the range 0.8 µm to 10 µm, a length in the range 0.8 µm to 20 µm and an aspect ratio in the range 10:1 to 200:1. Flakes having a thickness of 0.25 µm, a width of 3 µm and a length of 60 µm are particularly preferred. Where the elongate elements include tubes, these typically have a wall thickness in the range 0.08 µm to 2 µm, an outer wall diameter of between 2.5 and 100 times larger than the wall thickness and a length of between 10 and 500 times as large as the wall thickness. Tubes having a wall thickness of 0.08 to 0.5 µm, an outer diameter of 0.2 to 5 µm and a length of at least five times the outer diameter are particularly preferred.

The silicon comprising electroactive particles of the material of the first aspect of the invention may be in the form of native particles, pillared particles, porous particles, porous particle fragments or porous pillared particles. Typically the particles have an average diameter in the range 80 nm to 15 µm.

By the term "native particle" it is to be understood to mean particles that have not been subjected to an etching step. Such particles typically have a principle diameter in the range 1 µm to 15 µm, preferably 3 µm to 10 µm and especially 4 µm to 6 µm and are obtained by milling bulk or particulate silicon, preferably metallurgical grade silicon or high purity waste silicon produced during semi-conductor manufacture to the size required. By the term "Pillared Particles" it is to be understood to mean particles comprising a core and a plurality of pillars extending there from, where the pillars have a length in the range 0.5 to 10 µm, preferably 1 to 5 µm. Pillared particles can be prepared by etching silicon particles having dimensions in the range 5 to 40 µm, preferably 15 to 25 µm using the procedure set out in WO 2009/010758. Such pillared particles include particles having a principle diameter in the range 5 to 15 µm, 15 to 25 µm and 25 to 35 µm. Particles having a principle diameter in the range 5 to 15 µm typically include pillars having heights in the range 0.5 to 3 µm. Particles having a principle diameter in the range 15 to 25 µm typically include pillars having heights in the range 1 to 5 µm. Particles having a principle diameter in the range 25 to 35 µm typically include pillars having heights in the range 1 to 10 µm, preferably 1 to 5 µm. Pillared particles having a core diameter of 14 to 16 µm and a pillar length of 4 to 6 µm are particularly preferred.

A second preferred embodiment of the first aspect of the invention provides a composition comprising elongate elements having a diameter of from 150 to 200 nm and a length of 10 to 15 µm and particles having a diameter in the range 1 to 8 µm with a $D_{50}$ diameter of 4 to 6 µm, preferably 4 µm. (The $D_{50}$ diameter is the diameter at which 50% of the volume of particles present in the sample have a diameter of this value or less). The elongate elements and particles are both suitably silicon-comprising elongate elements and particles as described herein above. The silicon-comprising elongate elements suitably comprise 5 to 95% by weight of the composition of the first aspect of the invention and the silicon-comprising particles suitably comprise 95 to 5% by weight of the composition of the first aspect of the invention. Compositions comprising 90 wt % silicon fibres having a diameter of 150 to 200 nm and a length of 10 to 15 µm and 10 wt % silicon particles having a diameter in the range 1 to 8 µm with a $D_{50}$ of 4 µm were observed to maintain a charging capacity of 1900 mAh/g at a coat weight of 9.7 g/m$^2$ using a constant current charging regime for between 130 and 170 cycles. Compositions comprising 10 wt % silicon fibres having a diameter of 150 to 200 nm and a length of 10 to 15 µm and 90 wt % silicon particles having a diameter in the range 1 to 8 µm with a $D_{50}$ of 4 µm were observed to maintain a charging capacity of 1200 mAh/g at a coat weight of 16.5 g/m$^2$ using a constant current charging regime for more between 175 and 185 cycles. A third preferred embodiment according to the first aspect of the invention provides a composition comprising silicon-comprising pillared particles having an overall diameter of from 14 to 40 µm, with a $D_{50}$ of 24 µm and silicon particles having a diameter in the range 1 to 8 µm with a $D_{50}$ of 4 µm. Preferably the composition comprises 30 to 70 wt % each of the silicon-comprising pillared particle and the silicon-comprising particles as specified above. Compositions comprising 50 wt % of each of the pillared particles and particles having a diameter in the range 1 to 8 µm with a $D_{50}$ of 4 µm are especially preferred as these were observed to maintain a charging capacity of 1100 mAh/g at a coat weight of 13 g/m$^2$ for more than 330 cycles using a constant current charging regime.

By the term "Porous particle" it should be understood to mean particles having a network of voids or channels extending there through. These voids or channels include voids or channels that are enclosed or partially enclosed within the total volume of the particle as well as particles having channels extending into the interior of the particle from its surface. The porous particles are generally characterised by a substantially spherical shape and a relatively smooth surface morphology. The term "porous particle" should also be understood to include a particulate material comprising a random or ordered network of linear, branched or layered elongate elements, wherein one or more discrete or interconnected void spaces or channels are defined between the elongate elements of the network; the elongate elements suitably include linear, branched or layered fibres, tubes, wires, pillars, rods, ribbons or flakes. Layered elongate elements include structures in which the elongate elements are fused together. The branched elongate elements typically have a diameter in the range 50 to 100 nm with branches every 100 to 400 nm. By the term porous particle fragment it should be understood to include all fragments derived from silicon comprising porous particles as defined herein above. Such fragments include structures having a substantially irregular shape and surface morphology, these structures being derived from the silicon material originally defining or bounding the pores or network of pores within the porous particle from which the fragment structures are derived, without themselves comprising pores, channels or a network of pores or channels. These fragments will hereafter be referred to as fractals. The surface morphology of these fractal structures (which are devoid of pores or channels or a network of pores or channels) may include indentations or irregularities arising from the pores or channels or network of pores or channels originally bounded by the silicon structure. These fractal fragments will typically be characterised by the presence of peaks and troughs extending over the surface thereof and will include particles having a spiky appearance as well as those including a plurality of ridges extending from the surface of the particle. The peaks are characterised by a peak height and a peak width. The peak height is defined as the distance between the base of the peak (the place where the peak merges with the body of the fractal) and the apex of the peak. The peak width is defined as the minimum distance between one side of the peak and the other at half height. The term silicon comprising porous particle fragment also includes porous particle fragments comprising a network of pores and/or channels defined and separated by silicon comprising walls. These fragments will herein after be referred to as pore containing fragments. By the term "pore" or "channel" as defined in relation to porous particles from which the fragments are derived as well as the porous particle fragments themselves, it should be understood to mean a void or channel enclosed or partially enclosed within the total volume of the particle as well as a channel extending into the interior of the particle from its surface. The fractal can also be defined by the average thickness of the fractal body; this value is typically identical to the average thickness (smallest dimension) of an elongate element derived from a porous particle comprising a network of elongate elements or the average thickness of the electroactive material separating two adjacent pores within a pore containing porous particle.

These pore and/or channel comprising porous particle fragments are also characterised by an irregular shape and surface morphology. In contrast, the porous particles from which the fragments are derived are characterised by a substantially spherical shape and a relatively smooth surface morphology. Where the fractals and pore containing porous particle fragments are described together hereinafter they will collectively be referred to as silicon comprising porous particle fragments. The network of pores and/or channels suitably comprises a three dimensional arrangement of pores and/or channels extending through the volume of the particle in which the pore and/or channel openings are provided on two or more planes over the surface of the pore containing porous particle fragment. Porous particles typically have a principle diameter in the range 1 to 15 µm, preferably 3 to 15 µm and contain pores having diameters in the range 1 nm to 1500 nm, preferably 3.5 to 750 nm and especially 50 nm to 500 nm. Such particles are typically fabricated using techniques such as stain etching of silicon particles or wafers or by etching particles of silicon alloy, such as an alloy of silicon with aluminium. Methods of making such porous particles are well known and are disclosed, for example, in US 2009/0186267, US 2004/0214085 and U.S. Pat. No. 7,569,202. The term "particle" in relation to the particles referred to herein includes essentially spherical and non-spherical particles. Non-spherical particles include cubic, prismatic and decahedric shaped particles having a principle diameter and a minor diameter. It is preferred that the aspect ratio of the principle diameter to the minor diameter is in the range 3:1, preferably 2:1 and especially 1:1.

The silicon comprising elongate elements of the present invention may be prepared by any suitable methods known to a person skilled in the art, for example using the methods disclosed in WO 2009/010758, WO 2009/010757 and WO 2007/083155. The elongate elements are preferably prepared from single crystalline wafers or from single crystalline or polycrystalline silicon particles having a dimension in the range 80 to 800 µm. Silgrain™ silicon particles having dimensions in the range 80 µm to 0.8 mm that can be used in the manufacture of elongate elements can be obtained by grinding and sieving any one of the Silgrain materials sold by Elkem of Norway. Suitable Silgrain products that can be used in the preparation of elongate elements (fibres) (and also pillared particles) include Silgrain™ Coarse having dimensions in the range 0.2 to 2 mm, Silgrain™ HQ having dimensions in the range 0.2 to 0.8 mm and Jetmilled Silgrain™ having dimensions in the range 15 to 425 µm. These Silgrain products typically contain from 97.8 to 99.8% silicon and include impurities such as iron, Aluminium, Calcium and Titanium.

The silicon comprising elongate elements and particles may include a coating, preferably a coating made with carbon, such as amorphous carbon, graphite, electroactive hard carbon, conductive carbon, carbon based polymers or carbon black. Coats are typically applied to the silicon structures to a thickness of between 5 and 40% by weight of the coated silicon structure. Methods of coating silicon particles and elongate elements are known to a person skilled in the art and include chemical vapour deposition, pyrolysis and mechanofusion techniques. Carbon coating of silicon structures through the use of Chemical Vapour Deposition techniques is disclosed in US 2009/0239151 and US 2007/0212538. Pyrolysis methods are disclosed in WO 2005/011030, JP 2008/186732, CN 101442124 and JP 04035760. Carbon coatings are able to assist in controlling the formation and stability of SEI layers on the surface of the anode. As indicated above coatings other than carbon based coatings can be used. Examples of suitable alternative coatings include compounds such as lithium fluoride or lithium salts of cyclic organic carbonate species or suitable metals such as aluminium, copper, gold and tin as well as conductive ceramic materials. Lithium based coatings can be obtained by reacting silicon with a solution of LIF or exposing silicon to a solution comprising a mixture of lithium ions and a cyclic or acyclic carbonate.

As indicated above, the silicon component of the electroactive material according to the first aspect of the invention preferably comprises 5 to 95% by weight of elongate elements, preferably 10 to 90 wt %, more preferably 15 to 90% by weight, most preferably from 20 to 70%, for example from 30 to 50%. As indicated above, the elongate elements may be selected from one or more of the group comprising fibres, ribbons, pillared particles or flakes.

The silicon comprising component of the material according to the first aspect of the invention preferably comprises from 5 to 95% by weight of silicon comprising particles, preferably 10 to 90%, more preferably from 10 to 85%, more preferably from 30 to 80% and especially from 50 to 70% of silicon comprising particles by weight of the silicon component. As indicated above, the silicon comprising particles may be selected from one or more of the group comprising native particles, pillared particles and porous particles.

Compositions comprising fibres and/or ribbons as elongate elements and pillared particles are preferred because this provides the most efficient connectivity between the silicon comprising components of the electroactive material of the first aspect of the invention, whilst minimising the stresses that occur as a result of the volume changes that occur during the charging phase of the battery cycle. Native particles and/or porous particles may also be preferably added to the composition, since this has been found to improve the homogeneity of the composition. A fourth embodiment of the first aspect of the invention therefore provides a composition in which the silicon comprising component comprises one or more components selected from the group silicon comprising fibres, silicon comprising ribbons, pillared particles and optionally native particles and/or porous particles. The pillared particles preferably have a dimension in the range 5 to 35 µm and comprise pillars having a width in the range 80 nm to 250 nm and a length in the range 0.5 to 5 μm. The elongate elements preferably have a diameter in the range 80 to 250 nm and a length in the range 0.8 to 100 μm. The native particles, where present, preferably have a diameter in the range 1 to 8 μm with a $D_{50}$ of 4 μm. Without wishing to be constrained by theory, it is believed that the selection of pillared particles characterised by the dimensions given ensures that the particles tend to occupy the voids or pores created by the entanglement of the fibres or ribbons upon formation of the felt structure rather than contribute to the creation of additional pores or voids. The entanglement of the particle pillars with the fibres or ribbons of the mat ensures that the particles are retained within the felt structure during the charge and discharge phase of the battery, which maximises the connectivity between the silicon comprising components of the electroactive material per se and also between the silicon comprising components and any other conductive materials present therein, thereby improving the capacity of an anode prepared using the material according to the first aspect of the invention. Further, because the elongate elements and the particles are retained within the structure through entanglement rather than through close packing of particles, there is sufficient space to accommodate the inherent volume changes of the material that occur during the charging and discharging phases of a battery cell, for example. This entangled structure therefore improves both the capacity and cycle-ability of a material including this structure and hence its long term performance. Further, because the silicon structures used in the manufacture of the electrode or anode materials according to the invention are themselves relatively easy and inexpensive to produce, the associated costs of fabricating anodes or electrodes from such materials is consequently low.

In a fifth embodiment of the first aspect of the invention there is provided a composition comprising silicon fibres having a diameter (d) in the range 0.1 to 0.8 μm and silicon particles having a diameter (D) in the range 0.2 to 2.5 μm. The ratio of the diameter of the particles "D" to the diameter of the fibres "d" will depend, in part, on the packing density of the fibres and the relative volume of the fibres and particles within the material. Where the packing density of the fibres is in the range 3 to 30%, preferably 5 to 25%, it is preferred to use particles having a diameter that is not more than 2 to 3 times that of the diameter of the fibres. The volume ratio of the particle component of the electroactive material to the fibre component is preferably in the range 2:1 to 0.5:1. Without wishing to be constrained by theory, it is believed that the material of the third embodiment of the first aspect of the invention provides for good contact between the silicon components after many charging and discharging cycles of a battery.

A sixth embodiment of the first aspect of the invention provides a composition comprising silicon fibres having a diameter (d) in the range 0.08 to 0.3 μm and silicon particles having a diameter (D) in the range 0.4 to 10 μm and where D>3 d. The weight ratio of silicon particles to silicon fibres is in the range 9:1 to 1:9, suitably 4:1 to 0.6:1 and preferably, for example, 3:1 to 2:1. Preferably the composition according to the sixth embodiment of the first aspect of the invention comprises silicon fibres having a diameter in the range 100 to 200 nm and a length in the range 10 to 15 μm and native silicon particles having a diameter in the range 1 to 8 μm with a $D_{50}$ of 4 μm. The ratio of fibres to native particles for compositions comprising fibres having a diameter in the range 100 nm to 200 nm and a length 10 to 15 μm and native silicon particles having a diameter in the range 1 to 8 μm with a $D_{50}$ of 4 μm is preferably 9:1 since electrodes prepared using such compositions have a good stability and reduced delamination compared to electrodes of the prior art; batteries prepared with this 9:1 ratio of fibres and native particles also exhibit good capacity retention when charged to 1200 mAh/g at constant current conditions over more than 150 cycles. Compositions in which the ratio of fibres to native particles is 1:9 also exhibit good capacity retention when charged to 1200 mAh/g at constant current conditions over more than 150 cycles. However, some delamination of the electrode material was observed.

A seventh embodiment of the first aspect of the invention provides a composition comprising pillared particles of silicon and native silicon particles. The pillared particles of silicon provide both an elongate silicon comprising component and a particulate component and comprise a core having a diameter or thickness of less than 20 μm, preferably 5-15 μm and pillars having diameters around 50 nm-0.2 μm (for example 70 nm to 0.2 μm) and heights of 1-5 μm attached to the core with a packing density (or fractional coverage of the core surface area) of less than 50%, preferably in the region of 25-30%. Pillared particles having an overall diameter in the range 20 to 30 μm, preferably 25 μm and pillar lengths of up to 10 μm, preferably 4 to 6 μm are preferred. The native silicon particles suitably have a diameter of 30% to 100% of the diameter of the pillared particle core (e.g. 2-15 μm) and may comprise between 30 and 80% of the total weight of silicon present in the material. Preferably the native silicon particles have an overall diameter in the range 1 to 8 μm and a $D_{50}$ of 4 μm. It will be appreciated that the relative proportion of pillared particles to native silicon particles in the material will depend, in part, on the relative diameters of the components. The weight ratio of pillared particles to native particles in the silicon-comprising component of the composition is suitably in the range 90:10 to 10:90, preferably 70:30 to 30:70 and especially 50:50. Native particles having a relative diameter in the ranges stated above will generally fill any inter-particle spaces created by the pillared particles. A particular example would be native particles having a diameter of 5 μm and comprising 30% by weight of the silicon component mixed with pillared particles having a core diameter of 10 μm. Alternatively, in a particularly preferred embodiment, there is provided a composition comprising 50 wt % of the silicon component of pillared particles having an overall diameter in the range 20 to 30 μm, preferably 25 μm and pillar lengths of up to 10 μm, preferably 4 to 6 μm and 50 wt % native silicon particles having an overall diameter in the range 1 to 8 μm and a $D_{50}$ of 4 μm. Batteries prepared using these compositions and charged and discharged under constant current conditions exhibit a capacity retention of 1200 mAh/g over more than 300 cycles. An electrode or anode material according to any of the preferred embodiments of the first aspect of the invention will suitably comprise 50 to 90% of an electroactive material by weight of the electrode or anode material, preferably 60 to 80% and especially 70 to 80%. The electroactive material suitably comprises from 40 to 100% by weight silicon comprising elongate elements and particles, preferably 50 to 90% and especially 60 to 80%. Electrode materials comprising 70 wt % of a silicon comprising electroactive material are especially preferred. The electroactive material may include additional components selected from the group comprising non-silicon comprising electroactive materials; graphite and transition metal oxides or chalcogenides such as $MoO_2$, $WO_2$, $MnV_2O_6$ and $TiS_2$; aluminium and its compounds, tin and its compounds; germanium compounds, including germanium nano-wires; and ceramics such as, for example, titanate ceramics and bismuth selenide. These additional components suitably comprise 5 to 40% by weight of the electrode or anode material or mix.

In a preferred embodiment of the first aspect of the invention, the composition comprises, in addition to the silicon comprising elongate elements and particles, an electroactive carbon material. These electroactive carbons may be present in an amount comprising 2 to 50%, preferably 4 to 50%, for example 8 to 50% of the total weight of the electroacive material. Examples of suitable electroactive carbons include graphite, hard carbon, carbon microbeads and carbon flakes, nanotubes and nanographitic platelets. Suitable graphite materials include natural and synthetic graphite materials having a particle size in the range 5 to 30 µm. Electroactive hard carbon suitably comprises spheroidal particles having a diameter in the range 2 to 50 µm, preferably 20 to 30 µm and an aspect ratio of 1:1 to 2:1. Carbon microbeads having a diameter in the range 2 to 30 µm can be used. Suitable carbon flakes include flakes derived from either graphite or graphene.

The binder is a component used to bind the components of the anode mix together either upon formation of the felt like mat or on application of the components to the current collector. The binder helps to maintain the integrity of the anode mix when used in battery cells. It also functions to help the anode mix adhere to the current collector. The binder can be added in an amount of 0 to 30%, preferably 6 to 20%, more preferably 6 to 14% and especially 12% by weight based on the weight of the anode mix. Examples of binders include, but are not limited to, polyvinylidene fluoride, polyacrylic acid, modified polyacrylic acid, carboxymethylcellulose, modified carboxymethylcellulose, polyvinyl alcohol, fluorocopolymers such as copolymers of hexafluoroethylene, polyimide, polyacrylic acid, styrene butadiene rubber and thermo or photopolymerizable materials including, but not limited to, monomers, oligomers and low molecular weight polymers and mixtures thereof which are polymerizable by light irradiation and/or heat treatment. Examples of polymerizable monomers include epoxy, urethane, acrylate, silicon and hydroxyl based monomers and acrylic derivatives which may be used alone or in combination. Polymerisation of these materials is initiated with light irradiation or heat treatment. The polymerizable oligomer is a polymerisation product of from 2 to 25 monomers and may be formed into polymers having a higher degree of polymerisation by light irradiation or heat treatment. The term polymerizable low molecular weight polymer includes linear polymers and cross-linked polymers having a low degree of polymerisation or a low viscosity. Examples of such polymers include polyester acrylate, epoxy acrylate, urethane acrylate and polyurethane.

Preferably the binder is selected from one or more of a polyacrylic acid, a modified polyacrylic acid or alkali metal salts thereof. Lithium and sodium salts are preferred. Suitably the polyacrylic acid binder has a molecular weight in the range 150,000 to 700,000, preferably 250,000 to 550,000, especially 450,000. Polyacrylic acid binders and sodium polyacrylic acid binders are able to bind to silicon materials containing impurities and are an ionically conductive component within the assembled cell. Suitably the silicon materials used will have a silicon purity of 90% to 99.999%, preferably 90% to 99.99%, more preferably 90% to 99.95% and especially 95% to 99.95% and will include high purity silicon used in the manufacture of semi-conductors as well as metallurgical grade silicon such as the Silgrain® material produced by Elkem of Norway. Silicon materials having a purity of less than 99.95% may be advantageous because these materials can be cheaper and the impurities can improve conductivity. However if the level of impurities is too high the performance of the active material in the cell can be reduced and a purity in the range 90% to 99.95% is preferred, for example, 95% to 99.9%. It will be appreciated therefore, that the silicon comprising elongate elements, particles and other silicon comprising components used in the preparation of compositions according to the first aspect of the invention may be derived from metallurgical grade silicon which can reduce the materials cost compared to compositions containing higher purity grades of silicon. Batteries including electrodes containing compositions of the first aspect of the invention, which include a binder comprising polyacrylic acid, a modified polyacrylic acid or an alkali salt thereof exhibit a significant reduction in first cycle loss and longer cycling.

A particularly preferred eighth embodiment of the first aspect of the invention provides a composition comprising 10 to 95% by weight of silicon comprising components, including silicon comprising elongate elements and particles, 5 to 85% by weight of non-silicon comprising components and 0.5 to 15% by weight of a binder comprising polyacrylic acid and/or an alkali metal salt thereof. Preferred alkali metal salts include those derived from lithium, sodium or potassium. Preferably the silicon comprising components have a purity in the range 90 to 99.95% or in the range 95 to 99.9%.

A further preferred ninth embodiment of the first aspect of the invention provides a composition in the form of an electrode material, the composition comprising 60 to 80 wt % and preferably 70 wt % of an electroactive silicon-comprising material, 10 to 15 wt %, preferably 12 to 14 wt % of a binder, 0 to 4 wt % graphite and 6 to 18 wt %, preferably 6 to 12 wt % and especially 6 wt % of a conductive carbon. Especially preferred electrode compositions comprise 70 wt % of a silicon-comprising material comprising a mixture of silicon-comprising fibres and silicon-comprising native particles in a ratio of from 90:10 to 10:90, 14 wt % of a binder comprising polyacrylic acid or an alkali metal salt thereof, 4 wt % of graphite and 12 wt % of a conductive carbon. Compositions comprising 70 wt % of a silicon-comprising material comprising a 50:50 mixture of native particles and pillared particles, 12 wt % of a binder comprising polyacrylic acid or an alkali metal salt thereof, 12 wt % graphite and 6 wt % of a conductive carbon. The native silicon particles typically have a diameter in the range 1 to 8 µm with a $D_{50}$ of 4 µm. The silicon fibres typically have a diameter in the range 100 to 200 nm, preferably 150 nm to 200 nm and a length in the range 10 to 15 µm. The silicon pillared particles typically have an overall diameter in the range 14 to 40 µm, preferably 25 µm.

A viscosity adjuster may be present and is a component used to adjust the viscosity of the anode mix so that the mixing process and the application of the material to a current collector can be easily carried out. The viscosity adjuster can be added in an amount of 0 to 30% by weight based on the total weight of the anode mix. Examples of viscosity adjusters include, but are not limited to, carboxymethylcellulose, polyvinylidene fluoride and polyvinyl alcohol. Where appropriate, in order to adjust the viscosity of the anode mix, a solvent such as N-methyl pyrrolidone (NMP) may be used in an amount of 0 to 30% based on the total weight of the anode mix. In this case the solvent is removed before or after any polymerization or curing process.

A conductive material may also be present and is a component used to further improve the conductivity of the electrode or anode mix or material and may be added in an amount of 1 to 20% by weight based on the total weight of the anode mix. There is no particular limit to the conductive material so long as it has suitable conductivity without causing chemical changes in a battery in which it is included. Suitable examples of conductive materials include hard carbon; graphite, such as natural or artificial graphite; carbon blacks such as carbon black, acetylene black, ketjen black, channel black; conductive fibres such as carbon fibres (including carbon nanotubes) and metallic fibre; metellic powders such as carbon fluoride powder, aluminium powder and nickel powder; conductive whiskers such as zinc oxide and potassium titanate; conductive metal oxides such as titanium oxide and polyphenylene derivatives. Suitably the total amount of conductive carbon and electroactive carbon (such as graphite) comprises 4 to 85% of the total electroactive material by weight.

A filler is a further ingredient that may be present and can be used to inhibit anode expansion. There is no particular limit to the filler so long as it does not cause chemical changes in the fabricated battery and is a fibrous material. As examples of filler there may be used olefin polymers such as polyethylene and polypropylene and fibrous materials such as glass fibre and carbon fibres.

A coupling agent, if present, is a material used to increase adhesive strength between the active material and the binder and is characterised by having two or more functional groups. The coupling agent may be added in an amount of up to 0 to 30% by weight based on the weight of the binder. There is no particular limit to the coupling agent so long as it is a material in which one functional group forms a chemical bond via reaction with a hydroxyl or carboxyl group present on the surface of the silicon, tin or graphite-based active material, and the other functional group forms a chemical bond via reaction with the nanocomposite according to the present invention. Examples of coupling agents that can be used in the present invention include silane based coupling agents such as triethoxysilylpropyl tetrasuiphide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanopropyl triethoxysilane and cyanopropyl triethoxysilane.

An adhesive accelerator may be added in an amount of less than 10% by weight based on the weight of the binder. There is no particular limit to the nature of the adhesive accelerator so long as it is a material that improves the adhesive strength of the anode mix to the current collector. Examples of adhesive accelerators include oxalic acid, adipic acid, formic acid, acrylic acid and derivatives, itaconic acid and derivatives and the like. The silicon comprising components or structures of the composition of the first aspect of the invention suitably comprise a high purity polycrystalline silicon material as well as polycrystalline silicon materials comprising either n-type or p-type dopants as impurities. Polycrystalline silicon materials comprising n-type or p-type dopants are preferred because these materials exhibit a greater conductivity compared to that of high purity polycrystalline silicon. Polycrystalline silicon materials comprising p-type dopants are preferred; these materials suitably include one or more impurities selected from aluminium, boron or gallium as dopants.

The electrode materials can be characterised in relation to their density and their porosity. The electrode materials of the first aspect of the invention typically have density in the range 0.3 to 0.9 g/cm$^3$, preferably 0.4 to 0.8 g/cm$^3$. Electrode materials comprising a mixture of silicon-comprising fibres and silicon-comprising native particles in a ratio of 10:90 are characterised by a density of 0.79 g/cm$^3$. Electrode materials comprising a mixture of silicon-comprising fibres and silicon-comprising native particles in a ratio of 90:10 are characterised by a density of 0.43 g/cm$^3$. Further, the electrode materials of the first aspect of the invention typically have a porosity in the range 65 to 95%, preferably 65 to 85%. Electrode materials comprising a mixture of silicon-comprising fibres and silicon-comprising native particles in a ratio of 10:90 are characterised by a porosity of 69%. Electrode materials comprising a mixture of silicon-comprising fibres and silicon-comprising native particles in a ratio of 90:10 are characterised by a porosity of 83%.

The composition of the first aspect of the invention can be easily manufactured and a second aspect of the invention provides a method of preparing an electroactive material according to the first aspect of the invention, the method comprising the steps of mixing a. a plurality of metal or semi-metal comprising elongate elements selected from one or more of the group comprising fibres, tubes, threads, ribbons and flakes with b. a plurality of metal or semi-metal comprising particles Selected from one or more of the group comprising pillared particles, porous particles and porous particle fragments.

The method of the second aspect of the invention can be modified in that a. the elongate elements are selected from one or more of the group comprising fibres or threads having a diameter in the range 100 to 200 nm, tubes, ribbons and flakes; and b. the particles comprise native silicon particles.

A further modification of the method of the second aspect of the invention involves mixing an elongate element with a particulate element, wherein a. the elongate element is a pillared particle having a an overall diameter in the range 20 to 30 μm and pillar lengths of up to 10 μm; and b. the particles are selected from one or more of the group comprising native particles, porous particles and porous particle fragments.

Additional components may be used in the preparation of the material according to the first aspect of the invention. In a first embodiment of the second aspect of the invention there is provided a method of preparing a composition according to the first aspect of the invention, the method comprising mixing a plurality of elongate silicon comprising elements with a plurality of silicon comprising particles and adding thereto one or more components selected from the group comprising a binder, a conductive material, a viscosity adjuster, a filler, a cross-linking accelerator, a coupling agent and an adhesive accelerator. The material prepared according to this first embodiment can be used in the manufacture of electrodes, preferably anodes for use in lithium ion batteries. In a preferred embodiment of the second aspect of the invention, the method comprises the steps of mixing a plurality of elongate silicon comprising elements with a plurality of silicon comprising particles and a binder.

As discussed above, the composition according to the first aspect of the invention can be used in the manufacture of an electrode. The electrode is typically an anode. The electrodes are preferably used in the manufacture of a lithium secondary battery. A third aspect of the invention therefore provides an electrode comprising a composition according to the first aspect of the invention and a current collector. The composition according to the first aspect of the invention is suitably provided in the form of an electrode or anode mix or material, said mix or material comprising a plurality of elongate silicon comprising elements, a plurality of silicon comprising particles, a binder and optionally one or more components selected from the group comprising a conductive material and optionally a further electroactive material.

The anode mix can be provided in the form of a freestanding felt or mat for connection to a current collector. Alternatively the anode mix can be in the form of a layer, which is adhered to a substrate and connected to a current collector. In a particularly preferred embodiment, the substrate is a current collector and the electrode or anode mix or material is in the form of a layer applied thereto. The components of the anode mix from which the felt or mat is formed are preferably randomly entangled to provide optimum connectivity between the elements. The electrodes of the third aspect of the invention are easily prepared and a fourth aspect of the invention provides a method for fabricating an electrode comprising the steps of forming a slurry from a mixture comprising a plurality of silicon comprising elongate elements, a plurality of silicon comprising particles, a binder and a solvent; casting the slurry onto a substrate and drying the product to remove the solvent. The dried product is in the form of a cohesive mass which may be removed from the substrate, connected to a current collector and used as an electrode. Alternatively, where the composition according to the first aspect of the invention is adhered to the current collector as a result of casting and drying the slurry, the resulting cohesive mass will be connected to a current collector. In a preferred embodiment of the first aspect of the invention the anode mix is cast as a layer onto a substrate, which is itself a current collector. Additional components selected from the group comprising a conductive material, a viscosity adjuster, a filler, a cross-linking accelerator, a coupling agent and an adhesive accelerator may also be included in the slurry mixture. Examples of suitable conductive materials, viscosity adjusters, fillers, cross-linking accelerators, coupling agents and adhesive accelerators are provided above. Suitable solvents include N-methylpyrrolidone. Other suitable solvents known to a person skilled in the art of electrode design may also be used. The relative proportions of each of the components of the anode mix and the solvent, which are used in the manufacture of the electrode will depend, in part, on the dimensions of the elongate silicon comprising elements used in the mixture.

Suitable current collectors for use in electrodes according to the fourth aspect of the invention include copper foil, aluminium foil, nickel foil, carbon, conducting polymers and any other conductive materials. The current collectors typically have a thickness in the range 10 to 50 μm. Current collectors can be coated with the electrode mix on one side or can be coated with the electrode mix on both sides. In a preferred embodiment of the fifth aspect of the invention compositions of the first aspect of the invention is preferably applied to one or both surfaces of the current collector to a thickness of between 1 mg/cm$^2$ and 6 mg/cm$^2$ per surface such that the total thickness of the electrode (current collector and coating) is in the range 40 μm to 1 mm where only one surface of the current collector is coated or in the range 70 μm to 1 mm where both surfaces of the current collector are coated. In a preferred embodiment, the electrode or anode mix or material is applied to a thickness of between 30 and 40 μm onto one or both surfaces of a copper substrate having a thickness of between 10 and 15 μm. The current collector may be in the form of a continuous sheet or a porous matrix or it may be in the form of a patterned grid defining within the area prescribed by the grid metallised regions and non-metallised regions. Where the current collector comprises a continuous sheet, the electrode may be readily manufactured by applying a slurry of the anode mix directly to the current collector. Where the current collector comprises a metallised grid, this metallised grid may be formed onto a non-stick substrate such as PTFE to give a metallised non-stick surface (such as metallised PTFE) and the slurry of the anode mix is applied to the metallised non-stick surface and dried to give a metallised mat or felt.

In one embodiment of the fourth aspect of the invention, the electrode may be formed by casting the composition according to the first aspect of the invention onto a substrate thereby to form a self supporting structure and connecting a current collector directly thereto. In a preferred embodiment of the fourth aspect of the invention, a mixture of silicon comprising elongate elements, a plurality of silicon comprising particles, a binder and optionally one or more components selected from the group comprising a conductive material, a viscosity adjuster, a filler, a cross-linking accelerator, a coupling agent and an adhesive accelerator in a solvent is applied to a substrate and dried to remove the solvent. The resulting product can be removed from the substrate and used as a self supporting electrode structure. Alternatively, in a further embodiment, the composition according to the first aspect of the invention is cast onto a current collector and dried to form an electrode including a first layer comprising a composition according to the first aspect of the invention applied to a current collector.

The electrode of the third aspect of the invention can be used as an anode in the formation of a lithium secondary battery. A fifth aspect of the invention provides a secondary battery comprising a cathode, an anode comprising an electroactive material according to the first aspect of the invention and an electrolyte.

The cathode is typically prepared by applying a mixture of a cathode active material, a conductive material and a binder to a cathode current collector and drying. Examples of cathode active materials that can be used together with the anode active materials of the present invention include, but are not limited to, layered compounds such as lithium cobalt oxide, lithium nickel oxide or compounds substituted with one or more transition metals such as lithium manganese oxides, lithium copper oxides and lithium vanadium oxides. Examples of suitable cathode materials include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.05}Al_{0.05}O_2$, $LiNi_{0.4}Co_{0.3}Mn_{0.3}O_2$ and $LiNi_{0.33}Co_{0.33}Mn_{0.34}O_2$. The cathode current collector is generally of a thickness of between 3 to 500 μm. Examples of materials that can be used as the cathode current collector include aluminium, stainless steel, nickel, titanium and sintered carbon.

The electrolyte is suitably a non-aqueous electrolyte containing a lithium salt and may include, without limitation, non-aqueous electrolytic solutions, solid electrolytes and inorganic solid electrolytes. Examples of non-aqueous electrolyte solutions that can be used include non-protic organic solvents such as N-methylpyrrolidone, propylene carbonate, ethylene carbonate, butylenes carbonate, dimethyl carbonate, diethyl carbonate, gamma butyro lactone, 1,2-dimethoxy ethane, 2-methyl tetrahydrofuran, dimethylsulphoxide, 1,3-dioxolane, formamide, dimethylformamide, acetonitrile, nitromethane, methylformate, methyl acetate, phosphoric acid trimester, trimethoxy methane, sulpholane, methyl sulpholane and 1,3-dimethyl-2-imidazolidione.

Examples of organic solid electrolytes include polyethylene derivatives polyethyleneoxide derivatives, polypropylene oxide derivatives, phosphoric acid ester polymers, polyester sulphide, polyvinyl alcohols, polyvinylidine fluoride and polymers containing ionic dissociation groups.

Examples of inorganic solid electrolytes include nitrides, halides and sulphides of lithium salts such as $Li_5Ni_2$, $Li_3N$, LiI, $LiSiO_4$, $Li_2SiS_3$, $Li_4SiO_4$, LiOH and $Li_3PO_4$.

The lithium salt is suitably soluble in the chosen solvent or mixture of solvents. Examples of suitable lithium salts include LiCl, LiBr, LiI, $LiClO_4$, $LiBF_4$, $LiB_{10}C_{20}$, $LiPF_6$, $LiCF_3SO_3$, $LiAsF_6$, $LiSbF_6$, $LiAlCl_4$, $CH_3SO_3Li$ and $CF_3SO_3Li$.

Where the electrolyte is a non-aqueous organic solution, the battery is provided with a separator interposed between the anode and the cathode. The separator is typically formed of an insulating material having high ion permeability and high mechanical strength. The separator typically has a pore diameter of 0.01 to 100 µm and a thickness of 5 to 300 µm. Examples of suitable separators include microporous polyethylene films.

The battery according to the fifth aspect of the invention can be used to drive a device, which relies on battery power for its operation. Such devices include mobile phones, laptop computers, GPS devices, motor vehicles and the like. A sixth aspect of the invention therefore includes a device including a battery according to the fifth aspect of the invention.

It will also be appreciated that the invention can also be used in the manufacture of solar cells, fuel cells and the like.

The invention will now be described with reference to the following non-limiting examples. Variations on these falling within the scope of the invention will be evident to a person skilled in the art.

EXAMPLES

Example 1

Preparation of Electrode Materials

Example 1a

Fibres

The fibres were prepared by etching either p or n-type silicon wafers to produce pillars of around 10 µm high and diameters of from 100-200 nm, using a method set out in U.S. Pat. No. 7,402,829 or US2010/0151324 and then removing pillars from the wafer ultrasonically to produce fibres. The silicon fibres produced are characterised by a BET value of around 10-11 $m^2/g$.

Alternatively, the fibres can be produced by etching native silicon particles having an overall diameter in the range 40 to 200 µm using the method set out in WO2010040985 or EP2204868 and removing the pillars from the etched surface.

Example 1b

Native Silicon Particles

These were used as supplied. Specifically silicon particles comprising p-type doped metallurgical grade silicon having a purity of 99.8%, a diameter in the range 1 to 8 µm, with a $D_{50}$ of 4 µm and a BET value of around 5 $m^2/g$ were used in the preparation of compositions according to the first aspect of the invention. The particles were sold as Silgrain® J230 and were supplied by Elkem of Norway

Example 1c

Pillared Particles

Pillared particles were prepared by etching p-type metallurgical grade silicon powder particles having a purity of 99.8% and a diameter in the range 14 to 40 µm, with a $D_{50}$ of 24 µm in accordance with the methods set out in US 2011/0067228, WO2010040985 or WO2010040986. The silicon powder particles used as the starting materials in the preparation of pillared particles were obtained from Elkem of Norway and were sold as Silgrain® J320. The pillared particles produced were characterised by an overall diameter in the range 14 to 40 µm, with a $D_{50}$ of 24 µm.

Example 2

Preparation of Anodes

Example 2a

Anode 1

A silicon mix (1) was prepared by mixing 90 wt % of native silicon particles as described above with 10 wt % silicon fibres prepared in accordance with the procedure set out in Example 1a above.

A composite electrode mix was prepared by mixing the silicon mix (1) with a sodium polyacrylic acid binder, graphite and carbon black in the proportions 70:14:4:12 (Si:Polyacrylic acid:Graphite:Carbon Black). The Si material and the Carbon black were high shear stirred as an aqueous solution for several hours.

The polyacrylic acid binder was added (as a 10 wt % solution in water) and the resulting composite was further mixed by a dual asymmetric centrifugation technique for 10 minutes to give Anode Mix 1, which was then cast onto electrodeposited Cu foil to a coat weight of approximately 16.5 $g/cm^2$. Coat weights of 15-30 $g/m^2$ are typically used for electrochemical testing in a Soft Pack Pair cell. The coat was characterised by a density of 0.79 $g/cm^3$ and a porosity of 69%.

Example 2a

Anode 2

A silicon mix (2) was prepared by mixing 10 wt % of native silicon particles as described in Example 1b above with 90 wt % silicon fibres prepared in accordance with the procedure set out in Example 1a above.

A composite electrode mix was prepared by mixing the silicon mix (2) with a sodium polyacrylic acid binder, graphite and carbon black in the proportions 70:14:4:12 (Si:Polyacrylic acid:Graphite:Carbon Black). The Si material and the Carbon black were high shear stirred as an aqueous solution for several hours.

The polyacrylic acid binder was added (as a 10 wt % solution in water) and the resulting composite was further mixed by a dual asymmetric centrifugation technique for 10 minutes to give Anode Mix 2, which was then cast onto electrodeposited Cu foil to a coat weight of approximately 9.7 $g/cm^2$ and were used in the manufacture of a Soft Pack Pair cell. The composite coat was characterised by a density of 0.43 g/cm³ and a porosity of 83%.

Example 2c

Anode 3

A silicon mix (3) was prepared by mixing 50 wt % native silicon particles as set out above with 50 wt % of pillared particles as described in Example 1c above with 50 wt % native silicon particles as described in Example 1b above.

A composite electrode mix was prepared by mixing the silicon mix (3) with a sodium polyacrylic acid binder, graphite and carbon black in the proportions 70:12:12:6 (Si:Polyacrylic acid:Graphite:Carbon Black). The Si material and the Carbon black were high shear stirred as an aqueous solution for several hours.

The polyacrylic acid binder was added (as a 10 wt % solution in water) and the resulting composite was further mixed by a dual asymmetric centrifugation technique for 10 minutes to give Anode Mix 3, which was then cast onto electrodeposited Cu foil to a coat weight of approximately 13 g/cm² and were used in the manufacture of a Soft Pack Pair cell. The composite coat was characterised by a density of 0.43 g/cm³ and a porosity of 83%.

Example 3

Preparation of Batteries (Cells)

Negative electrodes (anodes) 1, 2 and 3 were prepared as described above. Electrode pieces were cut to the required size, and then dried overnight in a vacuum oven at 120° C., under dynamic vacuum. Slightly smaller pieces of standard lithium ion cathode material were prepared in a similar manner (active component either lithium cobalt oxide or a mixed metal oxide (MMO) i.e. $LiNi_{0.80}Co_{0.15}Al_{0.05}O_2$). Tags were ultrasonically welded to exposed areas of copper and aluminium on the two electrode pieces. Then the electrodes were wrapped between a continuous layer of porous polyethylene separator (Tonen), so that there was one layer of separator between the two electrodes. The winding was placed in an aluminium laminate bag, and the tags were thermally sealed along one edge. The cell was filled with the required quantity of electrolyte under partial vacuum, and the electrolyte was allowed to disperse into the pores. The bag was then vacuum sealed, and the cells were allowed to soak for a further thirty minutes before the start of cycle testing. Cells 1, 2 and 3 prepared from the negative electrodes 1, 2 and 3 were tested as set out below.

Example 4

Performance Data on Cells

Cells produced as described in Example 3 were cycled using Arbin battery cycling units using a constant capacity charge/discharge method. Discharge capacities close to either 1200 mAh/g (Cell 1), 1900 mAh/g (cell 2) and 1000 mAh/g (Cell 3) was maintained over more than 130 cycles. Table 1 lists discharge capacities for cells 1, 2 and 3 (4 repeats) comprising an MMO cathode, prepared as described above and cycled at a constant capacity of 1200 mAh/g (Cell 1), 1900 mAh/g (Cell 2) and 1000 mAh/g (Cell 3) until the cell fails (number of cycles until the discharge capacity falls below 80% of the first cycle discharge capacity).

From Table 1 it can be seen that Cell 1 (90:10 native particles:fibres) failed after 175 to 185 cycles. Some delamination of the electrode material was observed on failure.

Cell 2 (10:90 native particles:fibres) failed after 130 to 170 cycles. However, the non delamination of the composite anode was observed.

Cell 3 (50:50 native particles:pillared particles) failed after more than 300 cycles. The integrity of the composite anode was maintained throughout.

TABLE 1

| | Composition | | | Density | | [1] No Cycles charging cell to | [1] No Cycles charging cells to | [1] No Cycles charging cells to | | | |
|---|---|---|---|---|---|---|---|---|---|---|---|
| Fibre | Powder Elkem J230 | ppSi From J318 | Coat Composition Si:Binder:Graphite:C | of Coating Material | Porosity of Coating | 1200 mAh/g or 1.95 mAh/cm² | 1900 mAh/g or 1.9 mAh/cm² | 1100 mAh/g or 1.6 mAh/cm² | Fibre dimensions | Particle dimensions | ppSi dimensions |
| 10 | 90 | | 70:14:4:12 | 0.79 g/cc | 69% | 175-185 | | | (d) 150-200 nm | 4.5 μm Silgrain ® J230 powder from Elkem of Norway | (d)25 μm pillar height: 3-4 μm Prepared by etching Silgrain ® J318 powder particles |
| 90 | 10 | | 70:14:4:12 | 0.43 g/cc | 83% | | 130-170 | | | | |
| | 50 | 50 | 70:12:12:6 | | | | | >300 | (l) 10-15 μm | | |

[1] Cells were continuously charged and discharged to and from the capacity indicated using constant current conditions until the cell capacity dropped to below 80% of its initial value. The number of cycles indicates the cycle number at which this drop in capacity occurred.

The invention claimed is:

1. A composition comprising a plurality of electroactive elongate elements and a plurality of electroactive particles, the elongate elements and particles each comprising a metal or semi-metal selected from one or more of the group consisting of silicon, tin, and germanium or mixtures thereof, characterized in that
   a. the elongate elements are selected from one or more of the group consisting of fibers, tubes, ribbons and flakes and
   b. the particles are selected from one or more of the group consisting of pillared particles, porous particles and porous particle fragments; and
wherein the composition has a density in the range 0.3 g/cm³ to 0.9 g/cm³ and wherein the diameter of said plurality of particles is between the diameter of the elongate elements and three times the diameter of the elongate elements.

2. A composition comprising a plurality of electroactive elongate elements and a plurality of electroactive particles, the elongate elements and particles each comprising a metal or semi-metal selected from one or more of the group consisting of silicon, tin and germanium or mixtures thereof, characterized in that
   a. the elongate elements comprise pillars which extend outward from a particle core; and
   b. the particles are selected from one or more of the group consisting of porous particles, porous particle fragments and particles with an average diameter of 80 nm to 15 µm; wherein the composition has a density in the range 0.3 g/cm$^3$ to 0.9 g/cm$^3$ and
wherein the diameter of said plurality of particles is between the diameter of the elongate elements and three times the diameter of the elongate elements.

3. The composition according to claim 1, wherein the particles are selected from one or more of:
   a. porous particles comprising a random or ordered network of linear, branched or layered elongate elements having one or more discrete or interconnected void spaces or channels defined there between;
   b. pillared particles have an overall diameter in the range 20 to 30 µm;
   c. pillared particles having a principle diameter in the range 5 to 15 µm;
   d. pillared particles having a principle diameter in the range 15 to 25 µm;
   e. pillared particles having a principle diameter in the range 25 to 35 µm, and
   f. pillared particles have a pillar length of up to 10 µm.

4. The composition according to claim 1, wherein the elongate elements are selected from one or more of:
   a. elongate elements having a diameter of at least 50 nm;
   b. fibres having a diameter in the range 100 to 500 nm;
   c. ribbons having a thickness in the range 0.08 µm to 1 µm, a width in the range 240 nm to 300 nm, a length in the range 0.8 µm to 20 µm and an aspect ratio in the range 10:1 to 200:1;
   d. flakes having a thickness in the range 80 nm to 100 nm, a width in the range 0.8 µm to 10 µm, a length in the range 0.8 µm to 20 µm and an aspect ratio in the range 10:1 to 200:1; and
   e. tubes having a wall thickness in the range 0.08 µm to 2 µm, an outer wall diameter of between 2.5 and 100 times larger than the wall thickness and a length of between 10 and 500 times as large as the wall thickness.

5. The composition according to claim 1, wherein:
   a. the volume of the elongate elements is more than that of the particles; and
   b. the diameter of the particle is less than twice the length of the elongate element.

6. The composition according to claim 1, wherein the metal or semi-metal is a silicon comprising material selected from substantially pure silicon, silicon alloy and a material selected from silicon oxide, silicon nitride and silicon boride or mixtures thereof wherein optionally at least some of the elongate elements or particles comprise silicon with a purity in the range 90% to 99.95%.

7. The composition according to claim 1, which comprises 50 to 90% by weight of an electroactive material.

8. The composition according to claim 1, wherein the electroactive material comprises 40 to 100% by weight silicon comprising elongate elements, silicon comprising particles and further silicon comprising components.

9. A method of manufacturing the composition according to claim 2, comprising the steps of mixing
   a. a plurality of metal or semi-metal comprising electroactive elongate elements comprising pillars which extend outward from a particle core; with
   b. a plurality of metal or semi-metal comprising electroactive particles selected from one or more of the group consisting of porous particles, porous particle fragments and particles with an average diameter of 80 nm to 15 µm.

10. An electrode comprising a current collector and the composition according to claim 1.

11. A battery comprising a cathode, an anode comprising the composition according to claim 1 and an electrolyte.

12. A device employing a battery according to claim 11.

13. The composition of claim 7, additionally comprising one or more components selected from a binder, a conductive material.

14. The composition of claim 7, additionally comprising a non-silicon comprising electroactive material.

15. The method of claim 9 additionally comprising the step of combining the elongate elements and particles according to paragraphs (a) and (b) with a binder or with one or more components selected from the group consisting of a conductive material, a viscosity adjuster, a filler, a cross-linking accelerator, a coupling agent and an adhesive accelerator.

16. The method of claim 9 additionally comprising the step of combining the elongate elements and particles according to paragraphs (a) and (b) with a binder or with one or more components selected from the group consisting of a conductive material, a viscosity adjuster, a filler, a cross-linking accelerator, a coupling agent and an adhesive accelerator.

17. The method of claim 9 wherein the particles according to paragraphs (a) and (b) comprise silicon.

18. The method of claim 9 wherein the particles according to paragraphs (a) and (b) comprise silicon.

19. The composition of claim 1, additionally comprising a binder, wherein said composition is a homogeneous composite electrode material.

20. The composition according to claim 1 wherein a volume ratio of the electroactive particles to the electroactive elongate elements is in the range 2:1 to 0.5:1.

21. The composition according to claim 20 wherein the volume ratio is between the electroactive particles and electroactive elongate elements comprising fibres.

22. Use of the composition according to claim 19, in the manufacture of a secondary battery, wherein said manufacture comprises the steps of:
   applying said homogeneous composite electrode material as a coating to a substrate or a current collector to form a composite electrode layer; and
   using said composite electrode layer as an anode in a secondary battery.

* * * * *